United States Patent
Pao et al.

(10) Patent No.: US 10,430,649 B2
(45) Date of Patent: Oct. 1, 2019

(54) TEXT REGION DETECTION IN DIGITAL IMAGES USING IMAGE TAG FILTERING

(71) Applicant: Adobe Inc., San Jose, CA (US)

(72) Inventors: I-Ming Pao, Palo Alto, CA (US); Jue Wang, Woodinville, WA (US); Ke Ma, Redmond, WA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/650,669

(22) Filed: Jul. 14, 2017

(65) Prior Publication Data

US 2019/0019052 A1 Jan. 17, 2019

(51) Int. Cl.
G06K 9/00 (2006.01)
G06K 9/32 (2006.01)

(52) U.S. Cl.
CPC ....... G06K 9/00456 (2013.01); G06K 9/3258 (2013.01)

(58) Field of Classification Search
CPC ..... G06K 9/3258; G06K 9/00456; G06K 9/36
USPC ....................................................... 382/176
See application file for complete search history.

(56) References Cited

U.S. PATENT DOCUMENTS

| | | |
|---|---|---|
| 5,848,184 A | 12/1998 | Taylor et al. |
| 6,473,535 B1 | 10/2002 | Takaoka |
| 6,727,942 B1 | 4/2004 | Miyano |
| 7,020,330 B2 | 3/2006 | Schroder et al. |
| 7,555,165 B2 | 6/2009 | Luo et al. |
| 7,570,816 B2 | 8/2009 | Bargeron et al. |
| 7,576,753 B2 | 8/2009 | Saund et al. |
| 7,593,602 B2 | 9/2009 | Stentiford |
| 7,715,597 B2 | 5/2010 | Costache et al. |
| 7,747,495 B2 | 6/2010 | Malaney et al. |
| 7,864,990 B2 | 1/2011 | Corcoran et al. |
| 7,899,887 B2 | 3/2011 | Conn et al. |
| 7,920,528 B2 | 4/2011 | Karaoguz et al. |
| 8,140,584 B2 | 3/2012 | Guha |
| 8,176,004 B2 | 5/2012 | Malaney et al. |
| 8,335,355 B2 | 12/2012 | Costache et al. |
| 8,340,405 B2 | 12/2012 | Cooper et al. |
| 8,480,471 B2 | 7/2013 | Lutnick et al. |
| 8,548,246 B2 | 10/2013 | Al-Omari et al. |
| 8,612,971 B1 | 12/2013 | Fitzgerald et al. |

(Continued)

OTHER PUBLICATIONS

"First Action Interview Office Action", U.S. Appl. No. 15/043,174, dated Mar. 9, 2018, 8 pages.

(Continued)

*Primary Examiner* — Justin P. Misleh
(74) *Attorney, Agent, or Firm* — SBMC

(57) ABSTRACT

Text region detection techniques and systems for digital images using image tag filtering are described. These techniques and systems support numerous advantages over conventional techniques through use of image tags to filter text region candidates. A computing device, for instance, may first generate text region candidates through use of a variety of different techniques, such as text line detection. The computing device then assigns image tags to the text region candidates. The assigned image tags are then used by the computing device to filter the text region candidates based on whether image tags assigned to respective candidates are indicative of text.

20 Claims, 15 Drawing Sheets

(56) References Cited

U.S. PATENT DOCUMENTS

| | | | |
|---|---|---|---|
| 9,367,766 | B2 | 6/2016 | Wang et al. |
| 9,767,386 | B2 | 9/2017 | Lin et al. |
| 10,235,623 | B2 | 3/2019 | Lin et al. |
| 2003/0142112 | A1 | 7/2003 | Saund et al. |
| 2008/0002893 | A1 | 1/2008 | Vincent et al. |
| 2008/0010291 | A1 | 1/2008 | Poola et al. |
| 2009/0285482 | A1 | 11/2009 | Epshtein et al. |
| 2013/0011055 | A1* | 1/2013 | You ............... G06K 9/00973 382/165 |
| 2013/0346409 | A1 | 12/2013 | Welinder et al. |
| 2014/0193029 | A1* | 7/2014 | Vassilieva ............ G06K 9/342 382/103 |
| 2015/0356199 | A1 | 12/2015 | Mei et al. |
| 2015/0358549 | A1* | 12/2015 | Cho ............... H04N 5/23293 348/333.11 |
| 2016/0026899 | A1* | 1/2016 | Wang ................. G06T 7/11 382/176 |
| 2016/0379091 | A1 | 12/2016 | Lin et al. |
| 2017/0236032 | A1 | 8/2017 | Lin et al. |
| 2017/0236055 | A1 | 8/2017 | Lin et al. |
| 2017/0364773 | A1 | 12/2017 | Lin et al. |
| 2018/0032842 | A1* | 2/2018 | Yellapragada ........... G06T 7/11 |

OTHER PUBLICATIONS

"Non-Final Office Action", U.S. Appl. No. 15/094,633, dated Feb. 13, 2018, 31 pages.

"Preinterview First Office Action", U.S. Appl. No. 15/043,174, dated Dec. 29, 2017, 10 pages.

Ball,"Isodata, A Novel Method of Data Analysis and Pattern Classification", Stanford Research Institute, Apr. 1965, 79 pages.

Berhkin,"A Survey of Clustering Data Mining Techniques", Grouping Multidimensional Data, Springer (2006), 2006, 59 pages.

Bradley,"Constrained K-Means Clustering", May 2000, 9 pages.

Liang,"The K-Means-Type Algorithms Versus Imbalanced Data Distributions", IEEE Trans. on Fuzzy Systems, vol. 20, No. 4, Aug. 2012, pp. 728-745.

Welinder,"The Multidimensional Wisdom of Crowds", Advances in Neural Information Processing Systems, Dec. 6, 2010, 9 pages.

Xu,"A Comprehensive Survey of Clustering Algorithms", Annals of Data Science, Aug. 2015, 30 pages.

Yan,"Modeling Annotator Expertise: Learning When Everybody Knows a Bit of Something", Proceedings of the 13th International Conference on Artificial Intelligence and Statistics, Mar. 31, 2010, pp. 932-939.

"Final Office Action", U.S. Appl. No. 15/094,633, dated Mar. 1, 2017, 46 pages.

AbdAllah,"An Ensemble-Clustering Based Distance Metric and its Applications", Inti. Journal of Business Intelligence and Data Mining, vol. 8, No. 3, Feb. 2, 2014, 23 pages.

Raykar,"Eliminating Spammers and Ranking Annotators for Crowdsourced Labeling Tasks", Journal of Machine Learning Research, vol. 13, Jan. 1, 2012, 28 pages.

"Combined Search and Examination Report", GB Application No. 1621118.7, dated May 9, 2017, 5 pages.

"About Flickr", Retrieved at: https://www.flickr.com/about, 2 pages.

"Adobe Experience Manager Assets on Demand—Release Notes", Feb. 23, 2015, 5 pages.

"Behance—Online Portfolios on Behance", Retrieved at: https://www.behance.net/, 3 pages.

"Fotolia—Sell and buy royalty-free photos, images, vectors and videos", Retrieved at: https://us.fotolia.com/#, 3 pages.

"Non-Final Office Action", U.S. Appl. No. 14/747,877, dated Jan. 5, 2017, 6 pages.

"Non-Final Office Action", U.S. Appl. No. 15/094,633, dated Aug. 16, 2016, 33 pages.

"Notice of Allowance", U.S. Appl. No. 14/338,216, dated Feb. 17, 2016, 9 pages.

"Notice of Allowance", U.S. Appl. No. 14/747,877, dated May 17, 2017, 8 pages.

Anderson,"TagEz: Flickr tag recommendation", Association for the Advancement of Artificial Intelligence, Apr. 2008, 5 pages.

Bissacco,"PhotoOCR: Reading Text in Uncontrolled Conditions", IEEE Inti Conference on Computer Vision (ICCV), Dec. 2013, 8 pages.

Bosch,"Image Classification using Random Forests and Ferns", 11th IEEE Inti Conference on Computer Vision (I CCV), Oct. 2007, 8 pages.

Chee,"RecTree: An Efficient Collaborative Filtering Method", Intl. Conf. on Data Warehousing and Knowledge Discovery, Aug. 2001, 11 pages.

Dalal,"Histograms of Oriented Gradients for Human Detection", Conference on Computer Vision and Pattern Recognition, 2005, Jun. 2005, 8 pages.

Delong,"Fast Approximate Energy Minimization with Label Costs", International Journal of Computer Vision, vol. 96, No. 1, Jan. 2012, 25 pages.

Epshtein,"Detecting Text in Natural Scenes with Stroke Width Transform", IEEE Inti Conference on Computer Vision and Pattern Recognition (I CCV), Jun. 2010, 8 pages.

Forssen,"Maximally Stable Colour Regions for Recognition and Matching", IEEE Inti Conference on Computer Vision and Pattern Recognition, Jun. 2007, 8 pages.

Guillaumin,"TagProp: Discriminative Metric Learning in Nearest Neighbor Models for Image Auto-Annotation", IEEE 12th Intl_ Conf. on Computer Vision, Oct. 2009, 8 pages.

Huang,"Text Localization in Natural Images using Stroke Feature Transform and Text Covariance Descriptors", IEEE Inti Conference on Computer Vision (ICCV), Dec. 2013, 8 pages.

Isack,"Energy-based Geometric Multi-Model Fitting", Inti Journal of Computer Vision, Apr. 2012, 33 pages.

Jiang,"Estimating the Confidence Interval for Prediction Errors of Support Vector Machine Classifiers", Journal of Machine Learning Research, Mar. 2008, 20 pages.

John"Multivariate Analysis to Plackett and Burman Designs", Encyclopedia of Statistical Sciences, vol. 6, 1985, A Wiley-Interscience Publication, New York., 2009, pp. 581-591.

Kaptein,"Effective Focused Retrieval by Exploiting Query Context and Document Structure", PhD Thesis, FNWI: Institute for Logic, Language, and Computation, Oct. 2011, 27 pages.

Karatzaz,"Robust Reading Competition", 12th Inti Conference on Document Analysis and Recognition (ICDAR), Aug. 20013, 10 pages.

Krizhevsky,"ImageNet Classification with Deep Convolutional Neural Networks", In Advances in Neural Information Processing Systems 25, Dec. 3, 2012, 9 pages.

Lakkaruju,"A Bayesian Framework for Modeling Human Evaluations", Proceedings of the 2015 SIAM Intl. Conf_ on Data Mining, Jun. 2015, 9 pages.

Levenshtein,"Binary Codes Capable of Correcting Deletions, Insertions, and Reversals", In Soviet physics doklady, vol. 10, p. 707, Feb. 1966, 4 pages.

Matas,"Robust Wide Baseline Stereo from Maximally Stable Extremal Regions", Proceedings of BMVC, 2002, 10 pages.

Mishra,"Top-Down and Bottom-up Cues for Scene Text Recognition", IEEE Conference on Computer Vision and Pattern Recognition (CVPR), Jun. 2012, 8 pages.

Moreno,"Bayesian nonparametrics for crowdsourcing", PhD Thesis, Universidad Carlos III de Madrid., Jan. 2015, 21 pages.

Neumann,"On Combining Multiple Segmentations in Scene Text Recognition", International Conference on Document Analysis and Recognition (ICDAR 2013), Aug. 2013, 5 pages.

Neumann,"Real-Time Scene Text Localization and Recognition", 25th IEEE Conference on Computer Vision and Pattern Recognition, Jun. 2012, 8 pages.

Nguyen,"Consensus Clustering", Seventh IEEE Intl. Conf. on Data Mining, Oct. 2007, 607-612.

Pan,"A Hybrid Approach to Detect and Localize Texts in Natural Scene Images", IEEE Transactions on Image Processing, vol. 20, No. 3 Mar. 2011, pp. 800-813.

Ricotta,"Diversity Partitioning of Rae's Quadratic Entropy", Theoretical Population Biology 76 (2009),, Dec. 2009, pp. 299-302.

(56) References Cited

OTHER PUBLICATIONS

Shahab,"Robust Reading Competition Challenge 2: Reading Text in Scene Images", Conference on Document Analysis and Recognition (ICDAR), Sep. 2011, 6 pages.

Shi,"Scene Text Recognition using Part-based Tree-structured Character Detection", IEEE Conference on Computer Vision and Pattern Recognition (CVPR), Jun. 2013, 8 pages.

Vedaldi,"VLFeat—An open and portable library of computer vision algorithms", Proceedings of the 18th ACM international conference on Multimedia, Oct. 2010, 4 pages.

Viola,"Robust Real-Time Face Detection", In International Journal of Computer Vision, vol. 57, Issue 2, May 2004, 18 pages.

Wang,"End-to-End Scene Text Recognition", IEEE Inti Conference on Computer Vision (ICCV), Nov. 2011, 8 pages.

Wolf,"Object count/Area Graphs for the Evaluation of Object Detection and Segmentation Algorithms", Technical Reports LIRIS,, Sep. 2005, 28 pages.

Xu,"Retrieval of Soil Water Content in Saline Soils from Emitted Thermal Infrared Spectra Using Partial Linear Squares Regression", Remote Sensing vol. 7 No. 11, Nov. 2015, 17 pages.

Yin,"Robust Text Detection in Natural Scene Images", IEEE Transactions on Pattern Analysis and Machine Intelligence, Jun. 2013, 10 pages.

Zhang,"SVM-KNN: Discriminative Nearest Neighbor Classification for Visual Category Recognition", IEEE Computer Society Conf. on Computer Vision and Pattern Recognition, 8 pages.

"Final Office Action", U.S. Appl. No. 15/043,174, dated Aug. 6, 2018, 39 pages.

"Final Office Action", U.S. Appl. No. 15/094,633, dated Aug. 28, 2018, 13 pages.

"Non-Final Office Action", U.S. Appl. No. 15/680,282, dated Sep. 10, 2018, 5 pages.

Duygulu,"Object Recognition as machine translation: Learning a lexicon for a fixed image vocabulary", Apr. 29, 2002, 15 pages.

"Notice of Allowance", U.S. Appl. No. 15/094,633, dated Oct. 30, 2018, 10 pages.

"Foreign Office Action", GB Application No. 1621118.7, dated Feb. 27, 2019, 6 pages.

"Notice of Allowance", U.S. Appl. No. 15/680,282, dated Mar. 29, 2019, 7 pages.

* cited by examiner

TEXT REGION DETECTION IN DIGITAL IMAGES USING IMAGE TAG FILTERING

BACKGROUND

Text region detection may be employed by a computing device to support a variety of functionality. In one example, the computing device may first determine a location, at which, text is located within a digital image. Optical character recognition techniques are then be employed by the computing device to identify the text at the location. This text is then be used by the computing device as a basis to locate the digital image (e.g., as part of a keyword search), editing or modification of the text (e.g., a translation), and so forth.

Conventional text region detection techniques employed by the computing device are confronted with a variety of challenges. For example, detection of text from a digital image of a natural image scene (e.g., a sign in a landscape) involves numerous challenges due to the amount of diversity in both text appearance and surrounding backgrounds that are exhibited by these images. Text lines in natural images, for instance, that are used as a basis to identify a location of text may be disposed in a variety of orientations, fonts, sizes, and colors across a variety of digital images. Additionally, objects in such image scenes may include text-like properties that result in false-positives, e.g., windows, bricks, fences, branches of a tree, and so forth. As a result, conventional techniques employed by a computing device typically provide a significant amount of false positives, and thus result in image region detection inaccuracies and inefficient use of computational resources by the computing device in attempting to detect these regions. Further, this lack of accuracy and computational inefficiency may have a direct effect on techniques used by the computing device that rely on text region detection, such as for a keyword search, image editing and translation, and so forth.

SUMMARY

Text region detection techniques and systems for digital images using image tag filtering are described. These techniques and systems support numerous advantages over conventional techniques through use of image tags to filter text region candidates. A computing device, for instance, may first generate text region candidates in a variety of ways, such as text line detection. The computing device then assigns image tags to the text region candidates, e.g., through processing by classification models through machine learning.

The assigned image tags are then used by the computing device to filter the text region candidates based on whether image tags assigned to respective candidates are indicative of text, e.g., alphabet, font, letters, numbers, and so forth. Thus, the filtering may be used to increase text region detection accuracy and reduction of false positives by the computing device. This may also be used to improve computational resource efficiency of additional techniques that rely on accuracy of this detection (e.g., image search, translation, and so forth) as further described in the following sections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
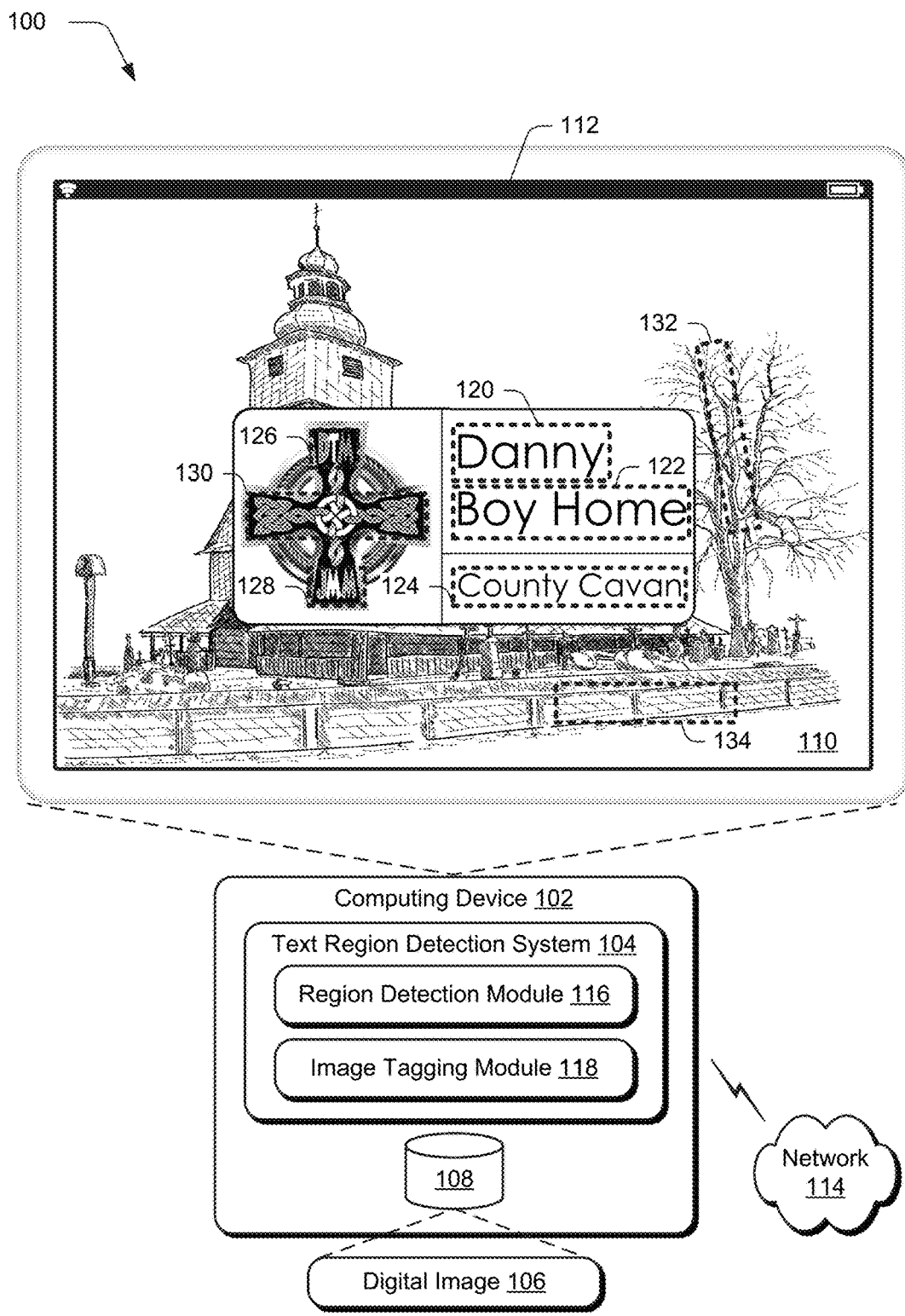
FIG. 1 is an illustration of an environment in an example implementation that is operable to employ text region detection techniques using image tag filtering as described herein.

Text region detection techniques and systems are described for digital images using image tag filtering that increase computational resource efficiency through reduction of false positives. In one example, this is performed by filtering text region candidates based on whether image tags have been assigned to the candidates that are indicative of text. As a result, the image tags may act to further verify a likelihood that a respective text region candidate includes text and reduce false positives caused by conventional techniques. Conventional techniques, for instance, may generate false positives caused by portions of a digital image of a natural image scene that include text-like structure, e.g., a fence, windows, brick wall, and so forth. By employing image tag filtering, however, these portions may be removed as text region candidates.

Conventional text detection techniques, for instance, typically include a component detection step that groups pixels of a digital image into text components and a text line extraction step that merges component candidates into final text regions. Thus, conventional text detection techniques follow a "bottom-up" paradigm in which pixel-level features are first extracted to form groups of pixels into text components. Nearby text components that are consistent (e.g., visually) with each other are then grouped into text lines. These conventional techniques, for instance, typically employ greedy methods by concatenating neighboring text components that are similar to form chain structures as test line candidates. In practice, however, detection of these text components by a computing device using conventional techniques results in numerous errors. One example of which is when conventional techniques are confronted with digital images of natural image scenes that may include text-like structures as described above, e.g., fences, patterns of leaves, bricks, and so forth that mimic text.

In the text region detection techniques and systems described herein, image tag filtering is employed to reduce an amount of false positives and improve computational efficiency in text region detection. In one example, a region detection technique is first employed to identify several different text region candidates in a digital image, e.g., as a bottom-up technique, graph-based technique, and so forth. The text regions candidates are then assigned image tags, e.g., through respective models as part of machine learning such as a binary classifier.

The text region candidates are then filtered based on whether the assigned image tags are indicative of text. After filtering, text region candidates that include image tags such as text, alphabet, letters, numbers, and so forth remain as part of a text region result. On the other hand, text region candidates that are not assigned image tags that are indicative of text are removed due to the filtering from the text region result. In this way, a number of false positive may be reduced and thus improve computational efficiency and accuracy of techniques that rely on text region detection, such as keyword searches, text editing, translation, and so forth.

In the following discussion, an example digital medium environment is first described that may employ the techniques described herein. A section then follows that describes text region candidate detection and filtering and is described in relation to FIGS. 2-6. Additional examples follow that describe text region candidate detection in greater detail as involving text lines in relation to FIGS. 7-11 and image tagging through machine learning in relation to FIG. 12-14. Example procedures are described within these sections which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 15.

The computing device 102 is illustrated as including text region detection system 104. The text region detection system 104 is implemented at least partially in hardware of the computing device 102 (e.g., through a processing system and memory) to detect a text region in a digital image 106 automatically and without user intervention. The digital image 106 is illustrated as stored in a storage device 108 (e.g., computer-readable storage media) and rendered in a user interface 110 by a display device 112. Although illustrated as implemented locally at the computing device 102, functionality of the text region detection system 104 may also be implemented as whole or part via functionality available via the network 114, such as part of resources of a web service or "in the cloud" as described above.

Examples of functionality incorporated by the text region detection system 104 to perform automated text detection in the digital image 106 include a region detection module 116 and an image tagging module 118. The region detection module 116 is configured to identify text region candidates in the digital image 106. In the illustrated example, the text region candidates 120-134 are generated for a digital image 106 that captures a natural image scene that includes a barn, trees, fence, as well as a logo and associated text. The image tagging module 118 is implemented at least partially in hardware of the computing device 102 to generate image tags for each of the text region candidates 120-134. The image tags are then used by the text region detection system 104 to filter the text region candidates 120-134, e.g., to remove false positives such as the text region candidates 130, 132, 134 of the logo, tree, and fence. In this way, an automated text region detection result output by the text region detection system 104 of the computing device 102 has improved accuracy and supports increased computational efficiency of subsequent techniques that rely on this result through reduction of false positives, such as image searches, translation, editing and so forth. Further discussion of these and other examples is included in the following sections and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Text Region Candidate Detection and Filtering

Figure 2:
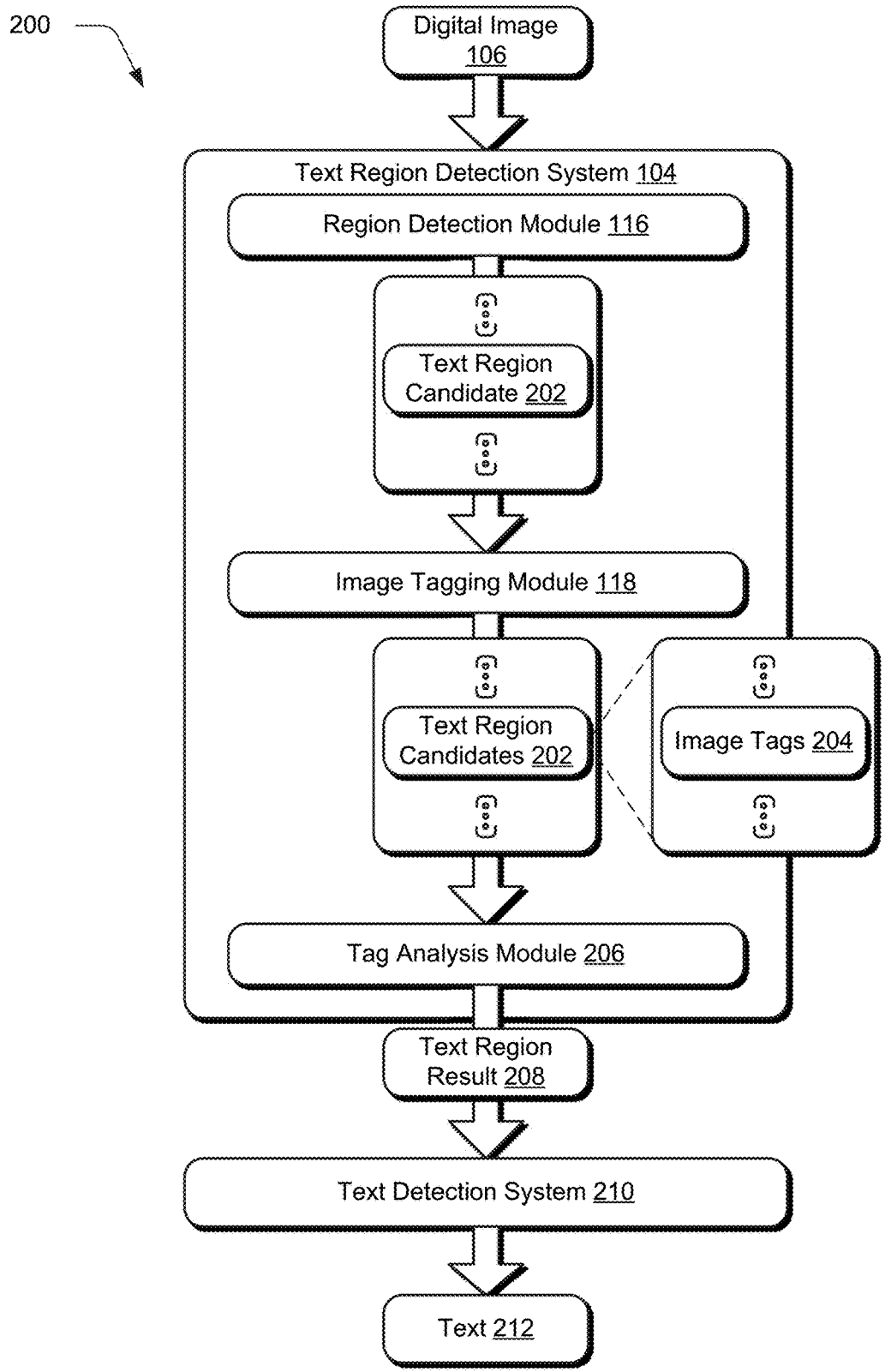
FIG. 2 depicts a system in an example implementation in which operation of a text region detection system of FIG. 1 is shown in greater detail.
Figure 3:
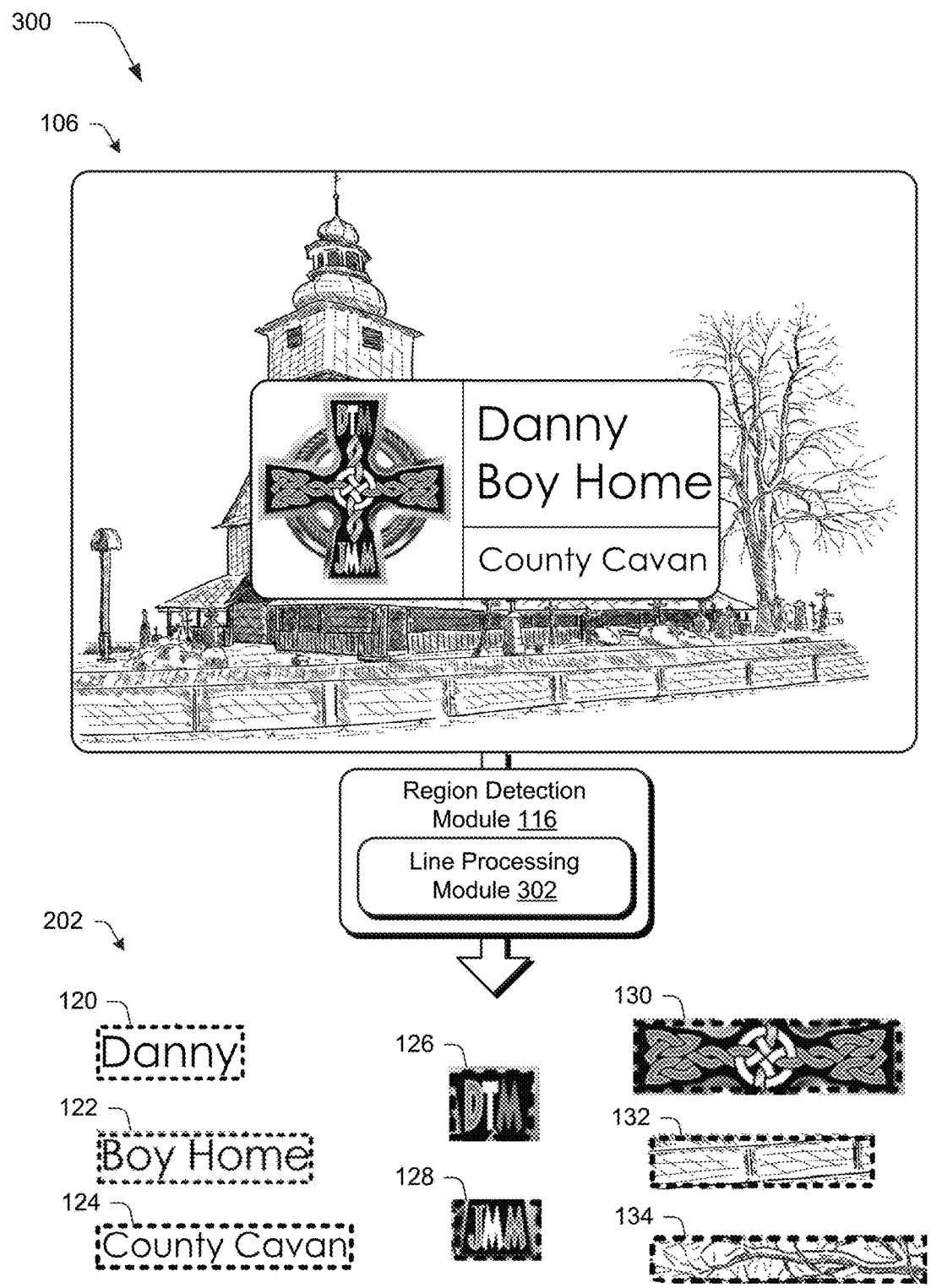
FIG. 3 depicts an example implementation in which text region candidates are generated from a digital image by the text region detection system.
Figure 4:
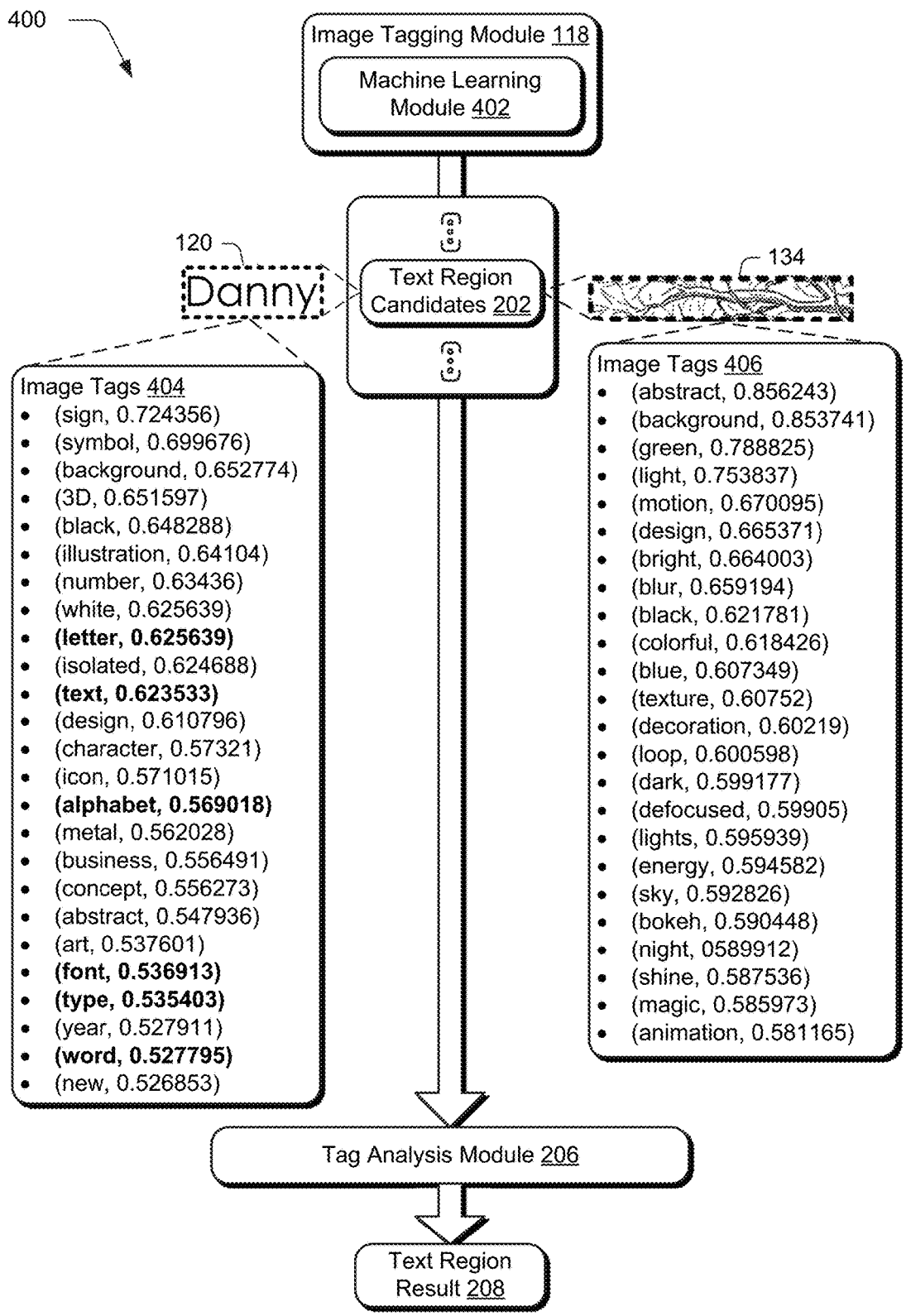
FIG. 4 depicts an example implementation in which image tags are assigned to the text region candidates through machine learning.
Figure 5:
FIG. 5 depicts an example implementation showing an example of text region candidates and a filtering result.
Figure 6:
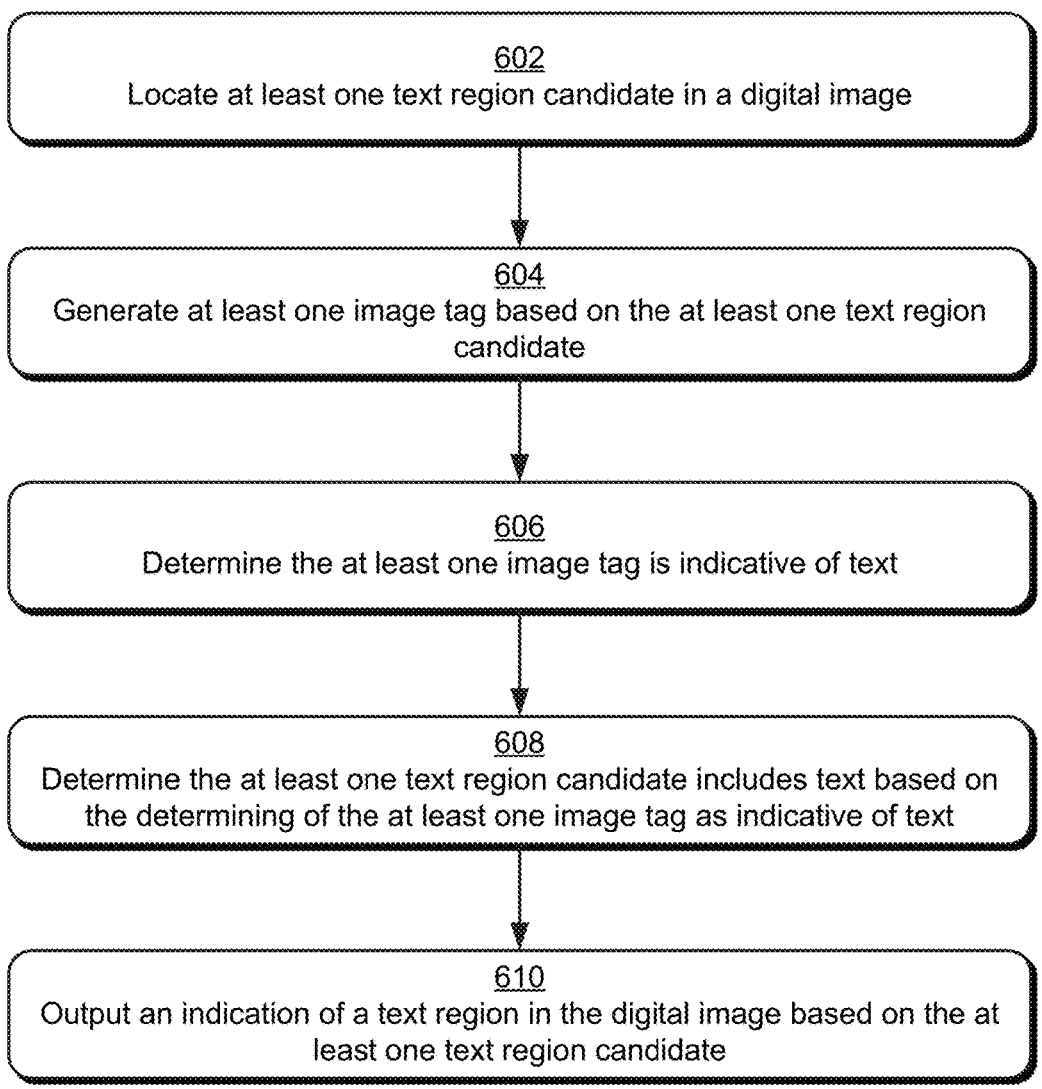
FIG. 6 is a flow diagram depicting a procedure in an example implementation in which text region candidates are generated, image tags are assigned to the text region candidates, and the assignment of the image tags is used to filter the text region candidates.

FIG. 2 depicts a system 200 in an example implementation in which operation of the text region detection system 104 of FIG. 1 is shown in greater detail. FIG. 3 depicts an example implementation 300 in which text region candidates are generated from a digital image by the text region detection system. FIG. 4 depicts an example implementation 400 in which image tags are assigned to the text region candidates through machine learning. FIG. 5 depicts an example implementation 500 showing an example of text region candidates and a filtering result. FIG. 6 depicts an example procedure 600 in which text region candidates are generated, image tags are assigned to the text region candidates, and the assignment of the image tags is used to filter the text region candidates.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-6.

To begin, a digital image 106 is received by the text region detect system 104. A region detection module 116 is first employed to locate at least one text region candidate 202 in the digital image (block 602). As shown in FIG. 3, for instance, the digital image 106 is received by the region detection module 116. The region detection module 116 includes a line processing module 302 that is configured to generate the text region candidates 202, examples of which are illustrated as the text region candidates 120-134 and associated bounding boxes.

In order the generate the text region candidates 202, the region detection module 116 may employ a variety of techniques, an example of which is described in greater detail in the Text Region Candidate Generation Section. The region detection module 116 first analyzes low-level pixel information of the digital image 106 by to extract various features, such as color, color consistency, stroke width, or other features and to group the pixels, accordingly. This may be done in multiple color spaces.

The line processing module 302 then generates best-fitting text lines between the text region candidates 202. To do so, the line processing module 302 initially generates each possible text line by drawing lines between pairs of text region candidates 202 that meet certain constraints as also further described below. These text lines may be referred to as candidate text lines.

Next, the line processing module 302 searches for the best-fitting text lines from the candidate text lines, e.g., using an optimization approach. This approach can iteratively minimize the differences between features of each matched text line and features of the associated text region candidates 202, while also minimizing the total number of matched lines.

The line processing module 302 then groups the text region candidates 202 based on the best-fitting text lines. In an implementation, the region detection module 116 prunes and splits each text line based on the text region candidates 202 that the text line intersects. This can involve analyzing the geometric attributes of the text region candidates to determine gaps by the line processing module 302. If a gap between two adjacent text region candidates is smaller than a threshold, these two text region candidates belong to a same group; otherwise, the two text region candidates belong to different groups and are output by the region detection module 116 as the text region candidates 202.

The text region candidates 202 are then communicated from the region detection module 116 to the image tagging module 118. The image tagging module 118 is representative of functionality to generate at least one image tag 204 based on the at least one text region candidate 202 (block 604). As shown in FIG. 4, for instance, the image tagging module 118 may employ a machine learning module 402 to employ machine learning to generate image tags 404, 406 for respective text region candidates 120, 134.

The machine learning module 402, for instance, may implement a binary support vector machine (SVM) classifier that employs a model learned through training digital images to output a probability (illustrated as associated numbers) that a respective text region candidate 202 is to be assigned a respective image tag. Thus, each model may output a probability for a respective image tag. Image tags that have a probability over a threshold amount (e.g., 0.5) are then assigned by the image tagging module 118 to the respective text region candidates 202. Further discussion of an example image tag technique that is employable by the image tagging module 118 is included in the Text Region Candidate Image Tagging Section.

The text region candidates 202 and associated image tags 204 are then provided to a tag analysis module 206. The tag analysis module 206 is configured to make a determination as to whether the at least one image tag 204 is indicative of text (block 606). Returning again to FIG. 4, the tag analysis module 418 may analyze the image tags 404 that have been assigned to the text region candidates 120 to determine if any of these tags are indicative of text. The tag analysis module 418, for instance, may include a list of images tags that have been identified as indicative of text and therefore determine whether any of the tags on the list have been assigned as image tags 404 to the text region candidates 120. The list, for instance, may include image tags that are or are associated with characteristics of text, illustrated examples of which are bolded in FIG. 4 and include letter, text, alphabet, font, type, and word for the image tags 404 of the text region candidate 120.

A determination is then made by a tag analysis module 206 that the at least one text region candidate includes text based on whether the text region candidate is assigned at least one image tag is indicative of text (block 608). Continuing the previous example, the tag analysis module 206 may determine that image tags 404 that are indicative of text (e.g., letter, font, word, etc.) have been assigned to the text region candidate 120 and as such, include this candidate as part of a text region result 208. On the other hand, image tags 406 assigned to the text region candidate 134 of branches from a natural image scene are not indicative of text and thus are not included in the text region result 208, i.e., are "filtered out." In this way, the text region result 208 has an increased likelihood of including text regions having text and protection against false positives, such as to include text region candidates 120-128 and not text region candidates 130-134.

Accordingly, an indication is output of a text region in the digital image based on the at least one text region candidate (block 610) as a result of the filtering performed based on the image tags. An example of this is illustrated in FIG. 5 in which candidate text regions are shown at a first stage 502 which are then filtered as shown at the second stage 504 to remove false positives, e.g., trees, part of the logo, and so forth.

In this way, the text region result 208 having text regions that are filtered from text region candidates 202 may promote increased accuracy and computational efficiency in subsequent techniques that employ this result, e.g., through reduction of false positives. An example of this is illustrated in FIG. 2 as a text detection system 210 that is configured to detect text 212 in the text region result 208 and associated detected text regions. The text detection system 210, for instance, may employ one or more optical character recognition techniques to detect text 212, which may then be output for use as part of a search, translation, text editing, and so forth through interaction with the computing device 102. Therefore, reduction in false positive text region candidates 202 through filtering performed using image tags 204 may reduce an amount of processing and storage resources used by the computing device 102 to perform these techniques.

Text Region Candidate Generation

This section describes an example of operation of the region detection module 116 to detect text region candidates 202 from a digital image 106. Generally, this example begins by receiving a digital image (block 702) as previously described in relation to FIG. 2, e.g., digital image 106 from the storage device 108. Further discussion of text region candidate generation may be found at U.S. Pat. No. 9,367,766, titled "Text Line Detection in Images," which is hereby incorporated by reference in its entirety.

The region detection module 116 is then employed by the computing device 102 to detect text region candidates (block 704). This operation can include analysis of low-level pixel information of the digital image 106 by the region detection module 116 to extract various features, such as color, color consistency, stroke width, or other features and to group the pixels in text components accordingly. In an implementation, the region detection module 116 generates representations of the digital image 106 in multiple color spaces, analyzes the representations, determines regions, and classifies the regions into text and non-text region candidates 202. The text region candidates 202 may be characterized with features that include geometric information, color space information, and a confidence level indication.

The region detection module 116 of the computing device 102 then generates best-fitting text lines (block 706). Each of the best-fitting text lines may intersect multiple text region candidates, but each text region candidate belongs to a single text line. To do so, the region detection module 116 initially generates each possible text line by drawing lines between pairs of text region candidates that meet certain constraints as further described below. These text lines may be referred to as candidate text lines. Features of a candidate text lines are set to include features of the corresponding pair of text region candidates and of any additional intersecting text component. Some of the candidate text lines may be the best-fitting lines, while the remaining candidate text lines may not and may be removed. Further, each text region candidate may belong to one or more candidate text lines.

Next, the region detection module 116 of the computing device 102 searches for the best-fitting text lines from the candidate text lines. To do so, the region detection module 116 matches the candidate text lines and the text region candidates using an optimization approach. This approach can iteratively minimize the differences between features of each matched text line and features of the associated text region candidates, while also minimizing the total number of matched lines. Candidate text lines that are not matched to a text region candidate are matched are removed. Candidate text lines that are matched to text region candidates are set as the best-fitting text lines.

The region detection module 116 is then used to group the text region candidates based on the best-fitting text lines (block 708). In an implementation, the region detection module 116 prunes and splits each text line based on the text region candidates that the text line intersects. This can involve analyzing the geometric attributes of the text region candidates to determine gaps. If a gap between two adjacent text region candidates is smaller than a threshold, these two text region candidates belong to a same group; otherwise, the two text region candidates belong to different groups.

Figure 7:
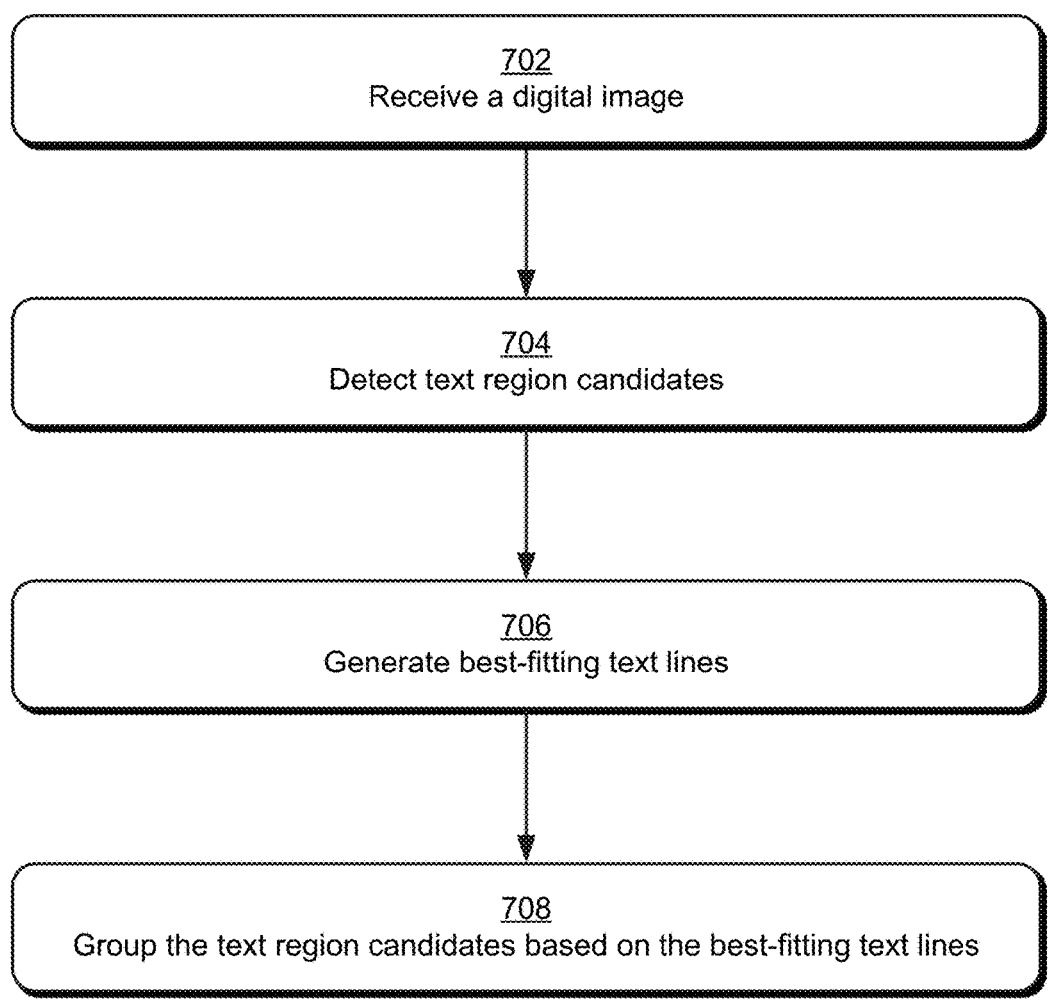
FIGS. 7-11 are flow diagrams depicting procedures in example implementations of text region detection in digital images by a computing device.
Figure 8:
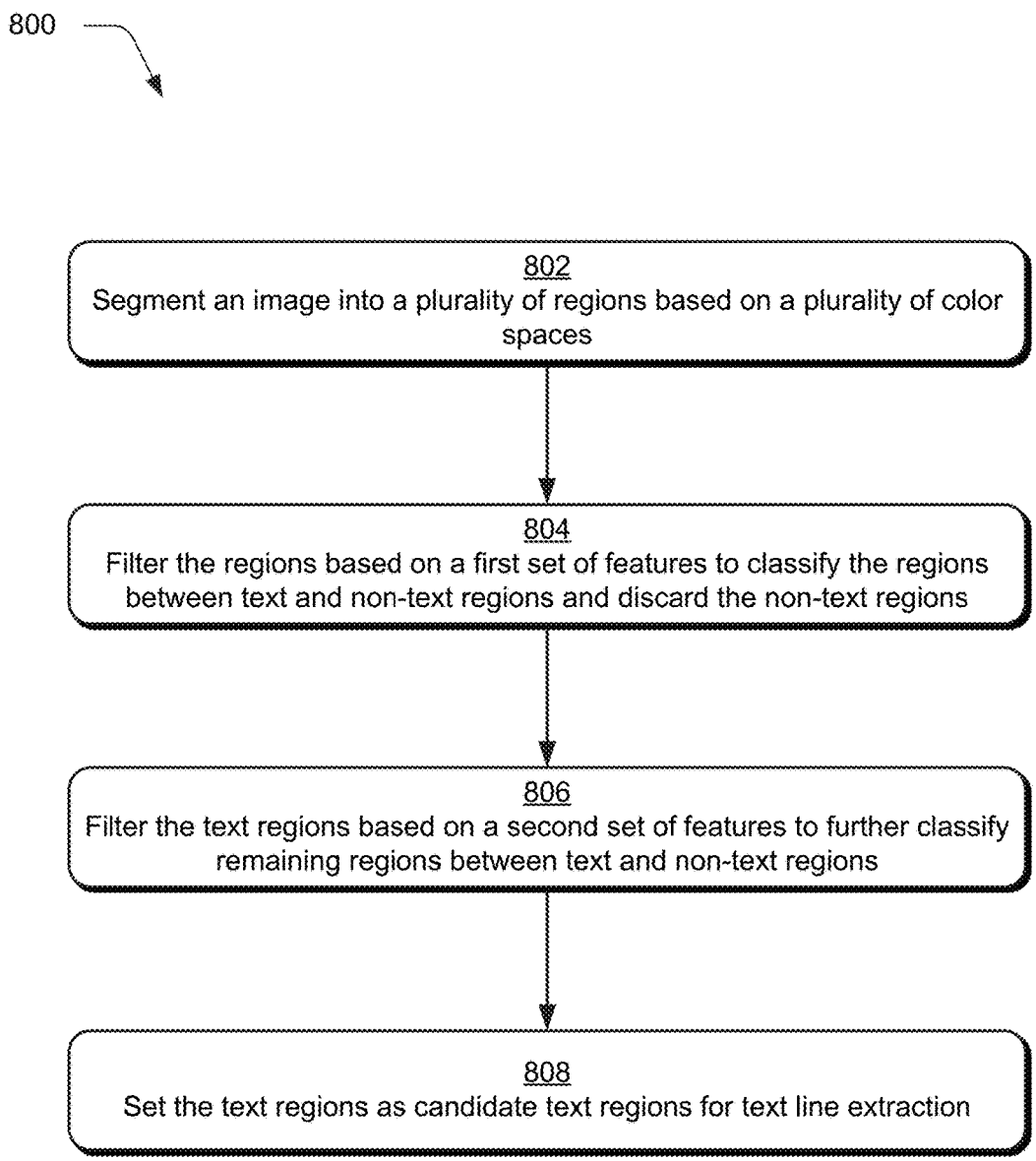

FIG. 8 depicts another example implementation describing detection of text region candidates in greater detail, e.g., the detection of text region candidates as described at block 704 of FIG. 7. To begin, the region detection module 116 segments a digital image 106 into a plurality of regions based on a plurality of color spaces (block 802). The use of different color spaces can increase the accuracy of the text region candidate detection as performed by the region detection module 116 by providing a larger and richer set of features across the color spaces for analysis.

The used spaces, for instance, can provide complimentary color channels to compare the features. Example color spaces include RGB, a grayscale, luminance, YCbCr, color gradient magnitude, IHSI gradient, color density, and other color spaces. As such, the region detection module 116 can represent the digital image 106 in each of the plurality of color spaces and can analyze features from these representations to generate regions. Other image processing techniques may be also used by the region detection module 116, such as Gaussian pyramids as further described herein below. In an implementation, features from the first representation are analyzed by the region detection module 116 to generate a first set of regions. Likewise, features from the second representation are analyzed by the region detection module 116 to generate a second set of regions. The first set and second set of regions are overlaid over the image. This can result in a large number of regions, some of which may overlap. Further, each of the regions may include text components or non-text components. Thus additional filtering can be implemented by the region detection module 116 to classify the regions between text and non-text region candidates as further described below.

To analyze the features in each of the representations, the region detection module 116 may implement one or a combination of algorithms configured to group pixels from the representation into regions based on the features. The algorithms include, for example, the stroke width transform (SWT), the stroke feature transform (SFT), the text covariance descriptor (TCD), maximally stable color regions (MSCRs), VLFeat library-based algorithm, and the maximally stable extremal regions (MSERs) algorithms.

In an implementation, a hierarchical segmentation is employed by the region detection module 116. In particular, the region detection module 116 generates each of the candidate regions by extracting regions from three-level Gaussian pyramids in two color spaces using MSER and VLFeat library-based algorithms, where regions can be generated using the MSER algorithm and can be extracted using the VLFeat algorithm. An example MSER algorithm is described in "Matas, J., Chum, O., Urban, M., Pajdla, T.: Robust wide-baseline stereo from maximally stable extremal regions. Image and vision computing 22(10), 2004, 761-767." An example VLFeat algorithm is described in "Vedaldi, A., Fulkerson, B.: Vlfeat: An open and portable library of computer vision algorithms. In: Proceedings of the international conference on Multimedia, A C M, 2010, 1469-1472." Use of Gaussian pyramids supports effective handling of blur and noise in the digital image 106 that can be suppressed in low pyramid levels. Use of Gaussian pyramids also allows a proper handling of different font sizes by generating different versions of segmentation at different resolutions.

The choice of color space for use by the MSER algorithm may support a variety of functionality. For robustness, grayscale and color gradient magnitude color spaces may be used. By also using color gradient magnitude space, substantially all if not actually all of the text region candidates in an image can be detected by the region detection module 116. As such, the color gradient magnitude space provides a complementary source for extracting regions including text region candidates. For a digital image 106 of typical size, there can be thousands of regions. Thus, additional filtering is implemented to reject non-text region candidates.

The region detection module 116 then filters the regions based on a first set of features (block 804). The filtering includes classifying the regions between text and non-text region candidates and discarding the non-text region candidates. This operation may correspond to a first stage filtering. Because at this point, there can be a large number of regions that may be filtered, most of which may not be non-text region candidates, computationally efficient features are used to relatively quickly train a classifier, e.g., a model as part of machine learning. The classifier can discard most of the non-text region candidates, resulting in reduced number of regions for further evaluation. These remaining regions may be further filtered in a second stage as further described in greater detail as follows.

In an implementation, five features are used to train a classifier (e.g., via machine learning) that is able to discard more than 70% of the regions. An example classifier is described in "Bosch, A., Zisserman, A., Munoz., X.: Image classification using random forests and ferns, 2007, ICCV." The five features for a region include an Euler number, a shape descriptor, an aspect ratio, an occupying ration, and a Euclidean distance. The Euler number is defined as the number of connected component minus the number of holes. Because each region is a connected component, the associated Euler number cannot surpass one. The shape descriptor is defined of as $4\pi A/P2$, where A and P are the area and perimeter of the region, respectively. The aspect ratio can represent the aspect ratio of a bounding box (e.g., a rectangle or some other polygon that bounds the region). The occupying ratio is defined as the area of the region divided by the area of the bounding box. The Euclidean distance corresponds to the Euclidean distance between the average color within the region and that of other pixels inside the bounding box.

These features can be set at a five-dimensional feature vector to train a random forest classifier via machine learning by the region detection module 116. The classifier produces a soft confidence value in a range between "0" and "1" for each region. To classify a region, the associated confidence value is compared to a threshold by the region detection module 116. If larger, the region is classified by the region detection module 116 as a text region candidate; otherwise, the region is classified as a non-text region candidate and is discarded. Because this is a first stage filtering, a small threshold (e.g., "0.1") is used to maintain a high recall at the end of this stage, e.g., to avoid removing false negatives at the expense of keeping a higher number of false positives.

The region detection module 116 then filters the text region candidates based on a second set of features to further classify the remaining regions between text and non-text region candidates (block 806). Thus, as a result the number of regions has been significantly reduced (e.g., to 30% in the previous example implementation) and therefore computationally expensive features for the remaining regions may be used. This filtering may correspond to a second stage. Similarly to the first stage, a multi-dimensional feature vector can be generated for each region and input to a classifier. However, this vector is typically of a higher dimension, e.g., includes a larger number of features, some of which may be more complicated to compute than the features used in the first stage. In turn the classifier classifies the regions between text and non-text region candidates and discards the non-text region candidates. The classifier can be a random forest classifier similar to the one implemented in the first stage.

In an implementation, the features of a region include the coordinates of every pixel within the region normalized by the bounding box, the stroke width at each pixel normalized by the smaller value between the width and height of the bounding box, pixel colors in RGB space, and binary layout labels (e.g., pixels lying on an edge of the region are labeled as 1; otherwise 0). For each feature, the values computed from each pixel are concatenated by the region detection module 116 to form vectors. A covariance matrix is built by the region detection module 116 on the above seven vectors (the first and third feature have two and three vectors, respectively). The up-right of this matrix is stretched into a 28-dimension feature vector. The five features used in the first stage are also appended to the end of this vector, together with one additional feature—a cover rate. The cover rate is defined as the number of pixels that have stroke width values divided by the total region size. The complete feature vector for a region has, thus, thirty-four dimensions in total. The feature vectors are used to train another random forest classifier by the region detection module 116 to generate a confidence value for each region. The confidence values are compared by the region detection module 116 to a threshold to classify the regions between text and non-text region candidates. If larger, the region is classified as a text region candidate by the region detection module 116; otherwise, the region is classified as a non-text region candidate and is discarded. As in the first stage, a small threshold (e.g., "0.1") is used to maintain a high recall.

In a further implementation, additional filtering stages may be used. In each of the additional stages, another set of features can be used to generate feature vectors for the remaining regions. The feature vectors are used to train a classifier by the region detection module 116 to generate confidence values for each region. The confidence values can be compared to a threshold to classify the regions in text region candidates and to discard non-text region candidates accordingly by the region detection module 116.

The region detection module 116 then sets the text region candidates as text region candidates for text line extraction (block 808). As a result, the region detection module 116 has filtered out non-text region candidates and classified the remaining regions as text region candidates 202. Each of these regions has a confidence value and a number of other features, e.g., color and geometric features. Accordingly, for each text region candidate, the region detection module 116 generates a text region candidate characterized based on some or all of the associated features.

In an implementation, each text region candidate is abstracted into an 8-dimensional feature vector: x coordinate, y coordinate, width, height, stroke width, R, G, B. The x and y coordinates correspond to the center position of the bounding box. The width and height correspond to the size of the bounding box. The stroke width corresponds to the average stroke width of pixels in the region. R, G, B correspond to the average color in the RGB space of the pixels. Each feature vector representing a region is also referred to as a data point in the following discussion.

Because different color spaces are used, there can be overlapping text region candidates. Thus, the region detection module 116 may remove overlapping text region candidates (or data points) since such regions include duplicate information. To do so in one example, the region detection module 116 implements a non-maximum suppression algorithm. An example of this algorithm is the conventional mean-shift based non-maximum suppression technique described in "Dalai, N., Triggs, B.: Histograms of oriented gradients for human detection, 2005, CVPR." In this example, the Epanechnikov kernel is used in the meanshift process. The meanshift can be expressed as $m(x) = \Sigma_{X_i \in N(X)} w(x_i) x_i / \Sigma_{X_i \in N(x)} w(x_i) x_i$. $x_i$ represents a data point (e.g., a text region candidate) in consideration. $W_{xi}$ represents the weight of the data point. The confidence value computed from the second filtering stage can be used as the weight. $N(x)$ is the local neighborhood of x, which is also known as the bandwidth. Since the text components may vary in size within an image, the bandwidth can be set to be proportional to the size of the region (e.g., the product of the third (width) and fourth (height) element of the data point $x_i$). After removing the overlapping text region candidates, or the duplicate data points, a text region candidate can be represented as a multi-dimensional vector (or a candidate data point) that includes a data point and the confidence value of that data point by the region detection module 116.

Hence, by implementing the procedure 800, the region detection module 116 can generate text region candidates in a digital image 106. Each text region candidate represents a region of the image that contains a text component at a certain confidence value. Further, each text region candidate is characterized by a set of features that can be used in extracting text lines. For example, the features are compared to and matched with features of candidate text lines, which allows finding the best-fitting text lines. As such, the text region candidates can be inputted into a text line extraction flow such as the one described in FIG. 9.

Figure 9:
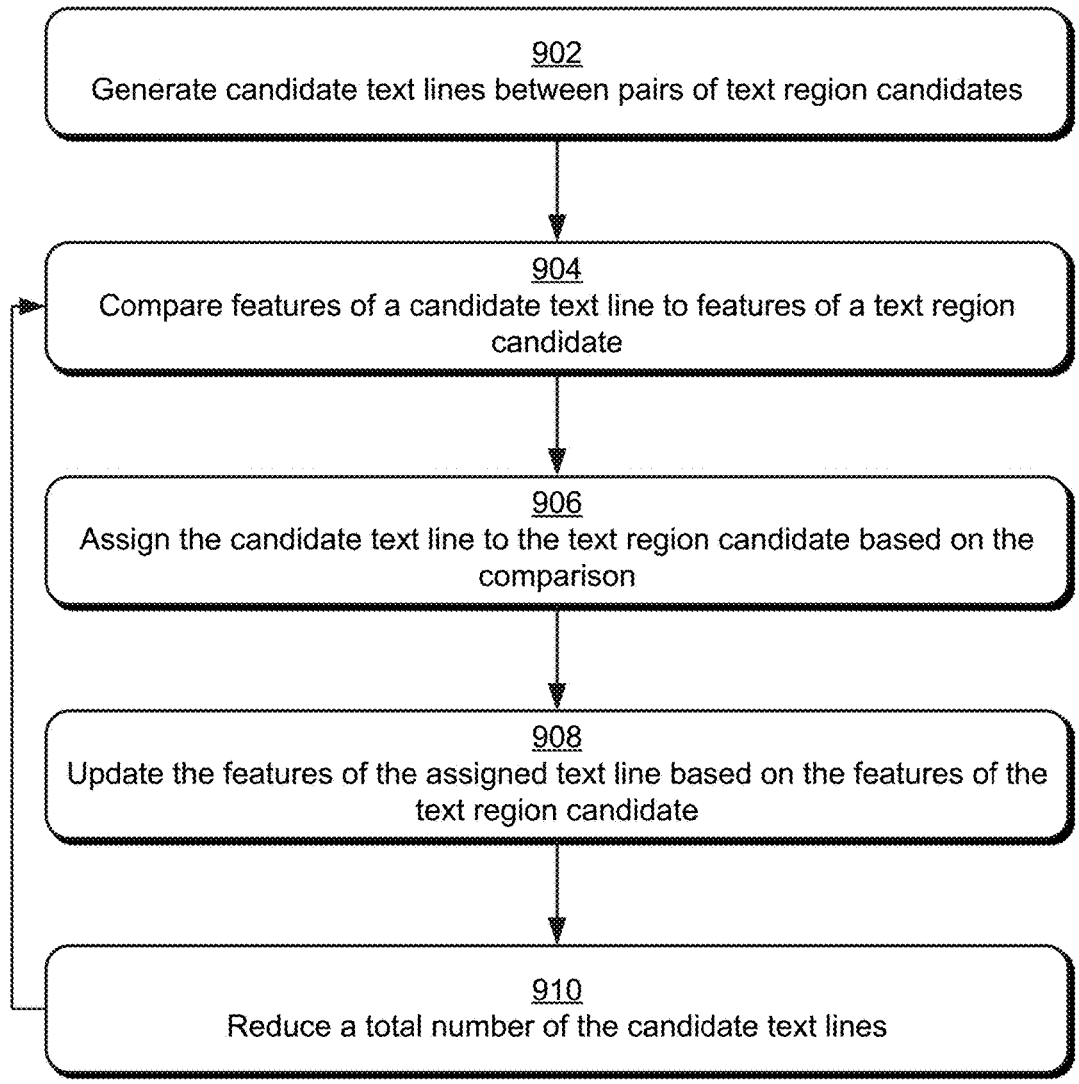
Figure 10:
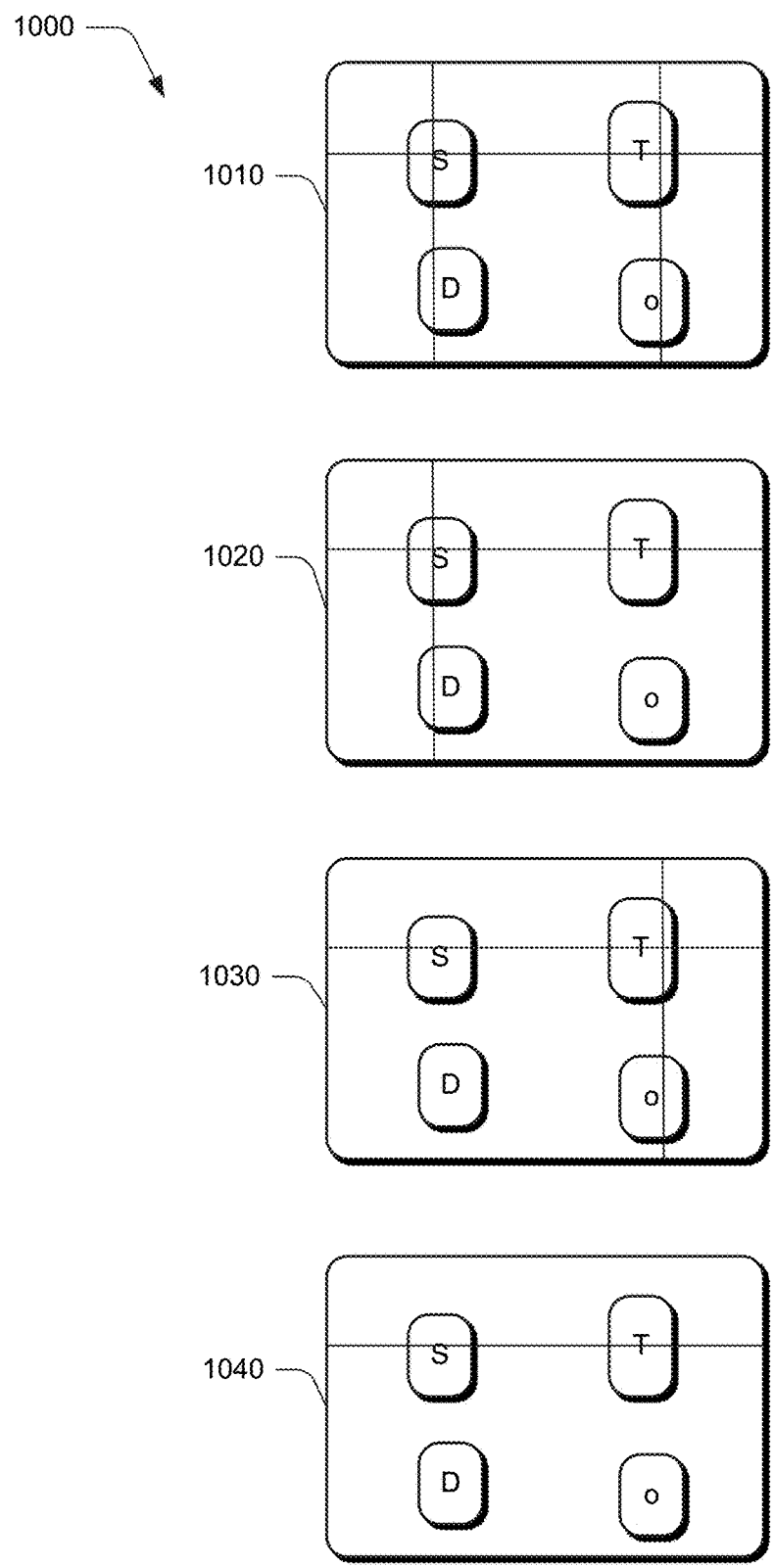

Reference is now made to an example procedure 900 of FIG. 9 that illustrates an example technique for extracting text lines. In particular, a region detection module 116 provides text region candidates and outputs text lines that best fit the text region candidates. To do so, the computing device considers information, such as various features, about all the text region candidates and all of possible text lines to select the best fitting text lines. In the interest of clarity of explanation, FIG. 10 illustrates examples of text region candidates and candidate text lines to describe aspects of the operations of the procedure 900 of FIG. 9.

In some instances, conventional line fitting approaches, such as using least squares to fit a line from some data points, do not yield to accurate results. That is because the total number of text lines in an image is unknown. Furthermore, there are a large number of outliers, as many background regions may also be included in the input data, and some of them may even have high confidence values (false positives). Accordingly, these regions are not included in the fitted text lines. Similarly, some true text region candidates may be assigned with low confidence values (false negatives).

Instead, a multi-model fitting approach may be used, where line fitting can be transferred into a model for minimizing energy. To cope with the unknown number of lines, the approach encourages fewer lines to be extracted. This assumes that text components tend to form fewer long lines rather than many short lines. To handle false positives, a special "outlier" label can be used in the model by the region detection module 116. Further, the text line fitting takes into consideration not only geometric or spatial properties, but also other features like stroke width and color. The approach includes multiple steps: an initial proposal, an energy minimization, and a re-estimation, where the last two steps are applied iteratively until convergence.

To begin, the region detection module 116 generates candidate text lines between pairs of text region candidates (block 902). These lines include each possible text line between text region candidates in one example. Each text region candidate can belong to one or more candidate text lines. As further described in the remaining operations, the region detection module 116 selects the best-fitting text lines from the candidate text lines. The selected text lines represent text lines that best fit the text region candidates and each text region candidate cannot belong to more than one of the selected text lines.

Further, the region detection module 116 generates a model out of the candidate text lines. The model includes each of these lines and may be referred to as a multi-line model. As further described in the remaining operations, the region detection module 116 inputs the text region candidates into the model. Next, the region detection module 116 compares, matches, updates, and reduces the number of candidate text lines based on this input. The region detection module 116 also removes text region candidates that are not matched to candidate text lines as these regions may represent outlier regions. After a few iterations, the remaining candidate text lines represent text lines that best fit the remaining text region candidates.

To generate the candidate text lines, the region detection module 116 considers pairs of text region candidates that meet certain constraints. An example constraint includes the distance between the two text region candidates. If less than a threshold, a candidate text line is generated between the two text region candidates (e.g., a line that goes through the centers of each region); otherwise, no text line is generated. Another example constraint includes other features of the two text region candidates. For example, color features (e.g., R, G, B colors, stroke width, or other features) of the two text region candidates are compared (e.g., a difference is computed). If sufficiently similar (e.g., the difference less than a threshold), the candidate text line is generated by the region detection module 116; otherwise no text line is generated. The different thresholds can be set based on testing that uses known images with known text lines, such that an optimal value of these thresholds are derived.

Once a candidate text line is generated, the region detection module 116 identifies additional text region candidates, if any, that the candidate text line intersects. Further, the region detection module 116 characterizes the candidate text line based on various features of the intersecting text region candidates. For example, the candidate text line can be set as a multi-dimension vector, where elements of the vector include one or more of geometric, color, and confidence features of the text region candidates. The geometric features can include a slope and coordinate intercepts. The color features can include color values and stroke width. The confidence features can include the confidence values of the text region candidates.

As illustrated in FIG. 10, snapshot 1010 represents an example of text region candidates and candidate text lines derived from the digital image 106 of FIG. 1. In this example, acceptable pairs of text region candidates include the S and T regions, the S and D regions, and the T and o regions. As such, there may be a candidate text line between the S and T regions (e.g., "S-T line"), a candidate text line between the S and D regions (e.g., "S-D line"), and a candidate text line between the T and o regions (e.g., "T-o line").

In an implementation, text region candidates are paired by the region detection module 116 using heuristic rules. For each text region candidate, only spatial neighbors within a pre-defined radius are considered by the region detection module 116. For each pair of text region candidates, the Euclidean distance is computed between them in the 8-dimensional feature space. If the distance is smaller than a predefined threshold, the line formed by them is set as a candidate text line. The radius can be set as "2.5×scale." The scale is defined as $\sqrt{w \times h}$, where w and h are the average width and height of the bounding boxes of the text region candidates. The threshold can be set as "0.4." The "2.5 scale" and "0.4" values are example values. Other values can also be used. As described herein above, the values can be set based on testing that uses known images with known text lines.

The region detection module 116 then compares features of a candidate text line to features of a text region candidate (block 904). At this operation, the candidate text lines have been generated and the text region candidates have also been defined. Although the lines were generated based on the regions, at this operation, the region detection module 116 can ignore any dependency. Instead, the region detection module 116 considers the candidate text lines and the text region candidates as two separate datasets and can search for best matches between the datasets. In a way, this matching becomes an assignment problem, where the region detection module 116 assigns the candidate text lines to the text region candidates such that an optimum solution is found. The assignment can be performed along multiple spaces. One space includes features, where the assignment minimizes differences between features of the candidate text lines and features of the text region candidates. Another space includes the total number of assigned text lines, as further illustrated at an operation of block 910. Briefly, the assignment minimizes the total number of assigned lines. This is under the assumption that that text components tend to form fewer long lines rather than many short line, especially in images of natural scenes.

In an example, the region detection module 116 selects a first candidate text line and compares the features of the candidate text line to features of a text region candidate. Next, the region detection module 116 selects a second candidate text line and performs a similar comparison. If the two comparisons indicate the first candidate text line is more similar to the text region candidate (e.g., less differences between the features), the first candidate text line is assigned or matched to the text region candidate; otherwise, the second candidate text line is used. This process is repeated for some or all of the candidate text lines across some or all of the text region candidates to find the best matches.

The region detection module 116 assigns the candidate text line to the text region candidate based on the comparison (block 906). As described above, by comparing the candidate text lines to the text region candidates, the region detection module 116 finds the best matches between the two datasets. As such, if a considered candidate text line is found to have features that best match features of a text region candidate, the computing device assigns that candidate text line to that text region candidate. As further described in the remaining operations of FIG. 9, the region detection module 116 can iteratively compare and assign the candidate text lines. In the initial iteration or after a few iterations, a text region candidate may be matched to more than one candidate text line. However, thereafter (e.g., when a solution converges) a text region candidate should be matched to no more than one candidate text line. Further, some of the text region candidates may not be matched to any candidate text lines. In this situation, these text region candidates are considered outliers (e.g., representing false positives) and can be removed.

As illustrated in FIG. 10, snapshot 1020 shows the result of comparing features of the three candidate text lines to features of the S region. In this example, the S-T line and S-D line may be more similar to the S region than the T-o line. Thus, either the S-T line or the S-D line, but not the T-o line, can be assigned to the S region. As shown in snapshot 1040, after a number of iterations, the computing device can determine that the S-T line is more similar to the S region than the S-D line and, thus, can assign the S-T line to the S region. Similarly, snapshot 1030 shows the result of comparing features of the three candidate text lines to features of the T region. In this example, the S-T line and T-o line may be more similar to the T region than the S-D line. Thus, either of the two lines, but not, the S-D line can be assigned to the T region.

The region detection module 116 then updates the features of the assigned text line based on the feature of the text region candidate (block 908). At this operation, a candidate text line has already been assigned to a first text region candidate by the region detection module 116. As such, the region detection module 116 can update the candidate text line (e.g., the vector or the definition of the candidate text line) to include some or all of the features of the first text region candidate. The update allows the information about the candidate text line to be refined, such that in the next iteration, the confidence in the assignment can be increased. The update also allows the computing device to account for similarities or differences between text region candidates, to which, the candidate text line is assigned. In other words, after the update, when the region detection module 116 compares the candidate text line to a second text region candidate, that comparison accounts for the features of the first text region candidate because these features have been added to the features of the candidate text line per the update. Thus, the update considers cross-correlations between the text region candidates.

The region detection module 116 can update features of a candidate text line at various stages of the procedure. For example, the region detection module 116 can update the candidate text line as soon as the candidate text line is assigned to a text region candidate (e.g., before comparing the candidate text line to another text region candidate). In this case, a faster convergence can be achieved. In another example, the region detection module 116 can update the candidate text line only after assigning the candidate text line to the various text region candidates (e.g., after completing the assignment). In this case, increased robustness is achieved with respect to local errors as part of detecting the text region candidates.

Further, the region detection module 116 can perform various types of updates. In an example, the region detection module 116 supplements the features of a candidate text line with features of a matched text region candidates. In another example, the region detection module 116 may not only supplement the features, but may also remove the features associated with a text region candidates to which the candidate text line is no longer assigned to. In yet another example, the region detection module 116 may remove and replace previous features of the candidate text line with features of the matched text region candidates. The update can include re-computing any average, deviation, or other metrics across the features of the candidate text line.

As illustrated in FIG. 10, the snapshots 1020 and 1030 show a comparison of the candidate text lines to the S and T regions, respectively, without an update. As explained herein above, each of these regions can be assigned to two lines after the first iteration. However, when an update is implemented, additional matching can be achieved. For example, after assigning the S-T line to the S region as shown in snapshot 1020, the features of the S-T line can be updated with features of the S region (in this example, assume that this update adds information to the features of the S-T line not previously added). As such, when the S-T line is compared to the T region, the update may provide additional information that can be used in the comparison. For instance, based on this update, the region detection module 116 may determine that the S-T line is more similar to the T region than the T-o line. Thus, instead of assigning the S-T and T-o lines to the T region as shown in the snapshot 1030, the computing device can assign the S-T line to the T region only as shown in the snapshot 1040.

The region detection module 116 then reduces the total number of the candidate text lines (block 910). This operation can facilitate two aspects associated with fitting the candidate text lines with the text region candidates. First, the region detection module 116 can remove unassigned candidate text lines, thereby reducing the total number. As such, after comparing, matching, and assigning the candidate text lines and the text region candidates as described in the previous operations, there may be candidate text lines that are not assigned to any text region candidate. Thus, those candidate text lines do not represent a good fit and are deleted.

Second, the region detection module 116 can remove candidate text lines (assigned or unassigned per the previous operations) as part of finding the best matches. More particularly, the region detection module 116 can minimize the total number of assigned text lines. For example, if one solution assigns two candidate text lines to two text region candidates and another solution assigns one candidate text line to the two text region candidates, the region detection module 116 may select the latter solution as providing a better match because of the reduction in the number of candidate text lines.

To illustrate, consider the snapshots 1020, 1030, and 1040 of FIG. 10. After comparing the candidate text lines to the S and T regions as shown in the snapshots 1020 and 1030, one solution includes assigning the S-D line to the S region and the T-O line to the T region. However, this solution may not be optimal because it does not result in the minimum number of lines. Instead, another solution includes assigning the S-T line to both the S and T regions. Because this solution represents the minimum number of lines, the region detection module 116 may select it over the other solution.

As further illustrated in the example procedure 900 of FIG. 9, after performing the operation of block 910, the computing device may iteratively re-perform operations of blocks 904-910. As such, after comparing, matching, assigning, updating, and deleting candidate text lines, and removing outliers the region detection module 116 can set the resulting features of the assigned text line as a new dataset. Thereafter, the region detection module 116 can compare the new dataset to the existing dataset of the features of the text region candidates (except for the removed outliers) to further fit the remaining text region candidates with the text region candidates. This process is iteratively repeated a number of times. Once complete, the region detection module 116 can set the assigned candidate text lines as the best-fitting text lines. At that point, the best-fitting text lines are characterized with the features of the text region candidates, from which, these lines are assigned.

The number of iterations can be set as the smaller of a solution converges or a predefined number. In an example, a solution converges when each text region candidate is matched to no more than one candidate text line. In another example, a solution converges when a percentage of the text region candidates is matched to no more than one candidate text line. This percentage can be predefined (e.g., 95% or some other percentage). The predefined number can be derived through testing using, for example, known images with known text lines. Generally, three to five times have been found to be a proper number.

In an implementation, the region detection module 116 generates a set L representing all candidate text lines 1 at block 902. As described above, each candidate text line 1 can be characterized using thirteen parameters derived from features of text region candidates. After obtaining the initial set L, the computing device treats each candidate text line 1 as a label. Further, the region detection module 116 tries to assign a proper label to each data point (e.g., text region candidate) to produce a line fitting result. In other words, the initial set L also serves as the initial set of labels.

Next, the region detection module 116 generates a model such as an energy function based on the labels. Minimizing the energy function represents an optimal solution that can be used to determine the best fitting lines. To do so, the region detection module 116 implements a Markov Random Field (MRF) regularization framework to estimate the label of every data point (e.g., text region candidate) by optimizing the following energy function:

$$E(L) = \Sigma_{p \in P} D_p(l_p) + \Sigma_{l \in L} H(l).$$

in which P represents the set of data points (e.g., text region candidates). The value "$l_p \varepsilon R'''$" represents the label assigned to a data point p, which corresponds to a line.

The first term in the energy function represents a data cost measuring how well a data point p fits with a line l. In other words, this term measure similarities or differences between a data point p and a line l. The computing device can use this term under operations of blocks 904-906. By optimizing this term (e.g., minimizing the total cost of assigning candidate text lines to text region candidates), two aspects of the optimization can be achieved. First, the differences (e.g., variance between features) between a candidate text line and associated text region candidates are minimized. Second, differences between the text region candidates associated with the same candidate text line are also minimized. This cost assignment term can be defined as:

$$D_p(l) = -\ln(G_{sd}(p, l)G_{sc}(p, l)G_{sw}(p, l)G_{cl}(p, l)w(p)).$$

in which $G_{sd}(p, l)$ measures the geometric error as:

$$G_{sd}(p.l) = \frac{1}{\sqrt{2\pi x\sigma}}\left(\exp\left(-\frac{(ax_p + by_p + c)^2}{2\sigma_{sd}^2 scale^2}\right)\right).$$

$x_p$ and $x_p$ represent the spatial coordinates of the center of the text region candidate represented by the data point p. It is worth noting that the perpendicular distance from a data point p to a line l is normalized by the scale parameter in order to exclude the influence of the image size. Similarly, $G_{sc}$, $G_{sw}$, and $G_{cl}$ represent normal distributions of parameters scale, stroke width, and RGB color. w(p) represents the confidence value of the data point.

The last term in the energy formula represents a label cost. The computing device can use this label cost to reduce the number of candidate text lines under operation 410. In an example, a fixed per-label cost is used and is defined as:

$$\Sigma_{l \in L} H(l) = \beta \|L\|_0$$

in which β represents a constant value (e.g., set at 40 or some other constant value). $\|L\|_0$ represents the total number of labels that have been assigned to data points. Thus if a label has no data point that it is being assigned to, the label cost term alone decreases by β. In other words, by using this term in the energy function, the region detection module 116 can minimizes the total number of candidate text lines by looking for the smallest possible label cost.

In addition to all the labels that correspond to candidate text lines, the region detection module 116 can add a special label to L called "outlier label." The data points receiving this label are the points that are most likely to be false positives (e.g., outlier text region candidates) and do not belong to assigned text lines. The data cost of these points is a constant set at a fraction of β (e.g., set at 15 or some other fraction). This fraction can be slightly larger than β divided by a desired number of outlier text region candidates. This is under the assumption that if this number of outlier text region candidates can fit well within a text line, the region detection module 116 encourages these outlier text region candidates to form the text line instead of marking them as outliers. For instance, by setting β at 40 and to group three outlier text region candidates together, the data cost can be set to 15, which is slightly larger than one third of 40. As such, if there are three or more outlier text region candidates that can fit well with a text line, the computing device can assign them to the text line.

In addition to the data cost and label cost, the energy function can also include a smoothness cost defined as:

$$\Sigma_{(p,q) \in N} V_{pq}(l_p, l_q).$$

In other words, the energy function can be expressed as:

$$E(L) = \Sigma_{p \in P} D_p(l_p) + \Sigma_{l \in L} H(l) \Sigma_{(p,q) \in N} V_{pq}(l_p, l_q)$$

The smoothness cost can be expressed as an exponential function on the distance between the data points. Basically, the smoothness cost encourages nearby data points to belong to the same label. However, based on testing, this smoothness cost does not necessarily contribute additional information to the energy function and can be set to zero (e.g., $V_{pq}=0$). That is because data similarity in local neighborhoods is already considered in the initialization step under block 902. Additionally, a rich set of features is used in the data cost to measure the similarity between a data point and other data points that belong to a text line, so adding a simple spatial smoothness constraint may not help much.

To minimize the energy function under operations of block 904-910, the region detection module 116 can implement, for example, an α-expansion or a greedy method algorithm. Examples of such algorithms are described in "Delong, A., Osokin, A., Isack, H. N., Boykov, Y.: Fast approximate energy minimization with label costs. International journal of computer vision 96(1), 2012, 1-27." Because the smoothness cost is set to zero and because a fixed label cost is used, the problem reduced to an uncapacitated facility location (UFL) problem. Although the α-expansion algorithm can be used, the greedy method algorithm is several times faster and achieves similar results. With the greedy method algorithm, the label set is initially empty, new label are gradually added to the set until the energy value does not decrease with subsequent labels.

After minimizing the energy function under block 904 and/or block 910, the region detection module 116 assigns each data point (e.g., text region candidate) either to a label corresponding to a candidate text line, or marks the data point as an outlier. Based on the new assignments, the region detection module 116 updates the features of the labels and/or the candidate text lines under block 908. This is similar to a K-means algorithm, where data assignment and cluster update are applied iteratively. For the first three features (a, b, c) of a candidate text line (or a label), which control the geometric position of the candidate text line, the region detection module 116 implements a total least squares (TLS) algorithm to update these features using the positions of the data points that belong to the candidate text line (or assigned to the label). Similarly, other features (e.g., scale, stroke width, R, G, B, the confidence value) can be estimated as the weighted averages of the corresponding features of the data points belonging to the candidate text line (or assigned to the label).

Once the update is complete, the region detection module 116 re-minimizes the energy function to re-assign labels to data points. This process iterates until the energy value converges. Finally, the region detection module 116 groups the data points sharing the same label to generate the best-fitting text lines.

Hence, by implementing the procedure 900 of FIG. 9, the region detection module 116 inputs a set of text region candidates and output a set of text lines. Each text line connects a number of the text region candidates. Instead of using local information or a graph approach to generate the text lines, the region detection module 116 considers global information about the text region candidates and all possible text lines. Based on this information, the region detection module 116 finds the best matches to generate the best-fitting text lines. As such, and as illustrated in FIG. 10, the region detection module 116 may initially generate all possible text lines (as shown in the snapshot 1010) and iteratively arrive to a best-fitting text line (as shown in the snapshot 1040).

Figure 11:
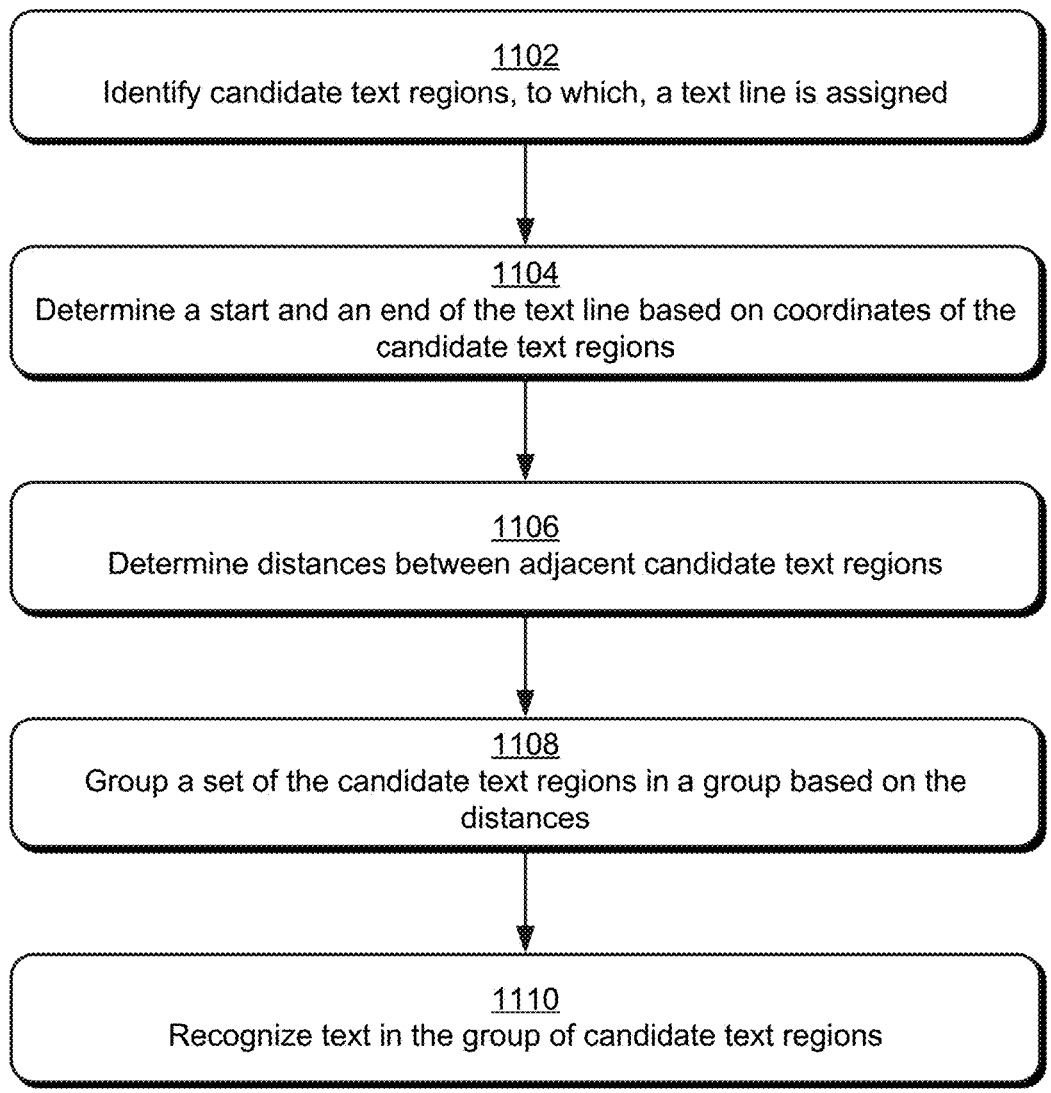

Turning to FIG. 11, a procedure 1100 is depicted to recognize text. More particularly, a computing device may perform the flow to analyze text lines and text region candidates and to, accordingly, extract text.

To begin in this example, the region detection module 116 a computing device identifies text region candidates, to which, that a text line is assigned (block 1102). In other words, the region detection module 116 determines the text region candidates that belong to each text line. Various techniques may be used. In one technique, the region detection module 116 selects a text line and determines which text region candidates the text line intersects. In another technique, if labels were used in generating the text lines, the region detection module 116 recognizes text region candidates assigned to a same label as belonging to a same text line that corresponds to the label.

The region detection module 116 then determines a start and an end of the text line based on coordinates of the text region candidate (block 1104). This operation represents pruning the text line. As described herein above, as generated in the example procedure 900 of FIG. 9, the text line in itself is unbounded. Thus, pruning the text line supports increased accuracy in recognizing text by limiting the area where text recognition may be applied. In an example, the region detection module 116 determines the geometric coordinates of, for instance, centers of the text region candidates. Based on the coordinates, the region detection module 116 determines two text region candidates that bound the remaining text region candidates. As such, the region detection module 116 sets one of these two text region candidate as the start and the other as the end of the text line. The start and the end may be defined using the coordinates of, for instance, the centers of these text region candidates.

In an implementation, the region detection module 116 inspects bounding boxes of each of the text region candidates assigned to a label of a text line to determine the actual length of the text line. As such, the actual length is the distance between the bounding boxes that represent the end points of the text line. The region detection module 116 can generate a final bounding box between the end points to encompass the different candidates.

Further, there is a chance that a background region (e.g., a false positive) is on the text line, but is spatially far away from some true text region candidates. In this case, the text line may be too long (e.g., the final bounding box too large). To avoid this problem, the region detection module 116 also checks the end points to judge whether the two end regions should contribute to the final bounding box of the text line. For example, if the spatial distance between an end point and its neighbor text region candidate is larger than a threshold, the region detection module 116 discards that end point from the text line. The threshold can be predefined. For instance, the region detection module 116 ice can set the threshold as four times, or some other number, of the average width of the text region candidates belonging to the text line. This threshold can also be defined based on testing that uses known images with known text lines and bounding boxes.

The region detection module 116 determines distances between adjacent text region candidates (block 1106). This operation is part of splitting the text line. For instance, there may be multiple words in the same text line. In this case, if the text line is not split (e.g., broken according to the different words), a text recognition algorithm may erroneously recognize text from these words as a single word. As such, the region detection module 116 may implement a splitting algorithm to avoid these types of errors. For example, the region detection module 116 determines the average distance and standard deviation between adjacent text region candidates that belong to a pruned text line (e.g., after removing some end-points as needed). Next, the region detection module 116 compares the distance between two adjacent text region candidates to the average. Based on this comparison, the region detection module 116 determines whether to break the text line or not. For instance, if the distance exceeds the average by a certain value, the computing device can decide to break the line. That is because the distance between the two text region candidates likely corresponds to a space between two different words. This value can be a function of the standard deviation (e.g., twice the standard deviation). In another example, the region detection module 116 may not limit the average and standard deviation to one text line. Instead, the region detection module 116 may consider similar information across all text lines. This may increase the accuracy of splitting the text line.

In an implementation, the region detection module 116 employs a heuristic technique. First, the region detection module 116 computes a gradient magnitude map inside the final bounding box of the text line, and projects the gradient magnitude map to the main axis of the text line to form a histogram. Assuming that the intervals between words often have significantly lower gradient magnitude values compared with text components, these intervals are represented as valleys in the histogram. The region detection module 116 then detects valleys (e.g., spaces) that are wider than the width of the largest text region candidate and uses the midpoints of the valleys as the splitting points. However, if the midpoint is inside a detected text component, the region detection module 116 discards this midpoint to avoid over-segmentation. For the same reason, the region detection module 116 does not allow more splitting points than half of the number of the text region candidates.

The region detection module 116 then groups a set of the text region candidates in a group based on the distances (block 1108). This operation is another part of splitting the text line. As described herein above, if a distance (e.g., a space of a valley) between two adjacent text region candidates exceeds a value, the region detection module 116 determines that the text line is to be broken at a point between the two text region candidates. As such, the region detection module 116 breaks the text line into multiple sub-lines based on the distances. The region detection module 116 also groups text region candidates belonging to each sub-line in a group, and may bound the grouped text region candidates with bounding boxes. Each bounding box may correspond to a word.

A text detection system 210 then recognizes text in the group of text region candidates (block 1110). For example, the text detection system 210 may apply an OCR algorithm to text region candidate within a bounding box. The OCR algorithm can recognize the text in the bounding box. Hence, by implementing the example procedure 1100 of FIG. 11, the computing device 102 may recognize text based on text lines and text region candidates. The pruning and splitting approaches may be simple, efficient, and computationally inexpensive to implement.

Text Region Candidate Image Tagging

This section describes an example of operation of the image tagging module 118 to tag digital images 106 or portions of digital images 106, such as text region candidates 202. Further discussion of image tagging may be found at U.S. patent application Ser. No. 15/043,174, filed Feb. 2, 2016, and titled "Accurate Tag Relevance Prediction for Image Search," the entire disclosure of which is hereby incorporated by reference.

Implementations described in the following are generally directed to training models as a classifier (e.g., a CNN) to predict a set of tags (keywords) together with relevance scores (or probabilities) for an image. The predicted relevance-weighted tags (a tag that has been weighted with a corresponding tag relevance score) can be used in large-scale keyword-based image retrieval, image tag proposal, and image tag auto-completion based on user input as described above. In particular, an enhanced clustering technique provides balanced clusters with increased efficiency in training and reduces overfitting. Further, an enhanced voting scheme reduces the effect of tagging biases and provides better predictive performance, particularly for rare or very specific tags. Consequently, more accurate image retrieval results.

Initially, during training, a clustering technique (e.g., a modified recursive KMeans (R-KMeans) technique described below) is utilized by the image tagging module 118 to reduce cluster imbalance in the data that is input into the CNN, such as the one described above, for training feature data. The modified R-KMeans technique employed by the image tagging module 118 overcomes cluster imbalance by recursively applying KMeans clustering on remaining dominant clusters (clusters that have the majority of data points) after removing other clusters of desirable sizes. As a result, balanced clusters are generated by the image tagging module 118 for training the CNN feature. In some implementations, the modified R-KMeans clustering technique can also be utilized to measure data point similarity (based on how many times the modified R-KMeans clustering technique results in a pair of data points being in the same cluster) that can be utilized for tag propagation (to tag untagged images). The tag propagation technique, described in more detail below, improves the tag prediction performance for rare tags.

During testing, a diversity based voting framework is utilized to overcome user tagging biases. A voting scheme (e.g., a Div-KNN voting scheme) employs a diversity-based voting framework to overcome user tagging biases by considering similarity of tag providers are during voting. This framework enables votes from similar annotators to be consolidated to reduce the effect of user tagging biases. In some implementation, bigram re-weighting is utilized during image retrieval to address the problem where the meaning of a word might be different than its meaning in a bigram. In this way, a keyword that is likely to be part of a bigram is down-weighted based on the predicted tag set.

Figure 12:
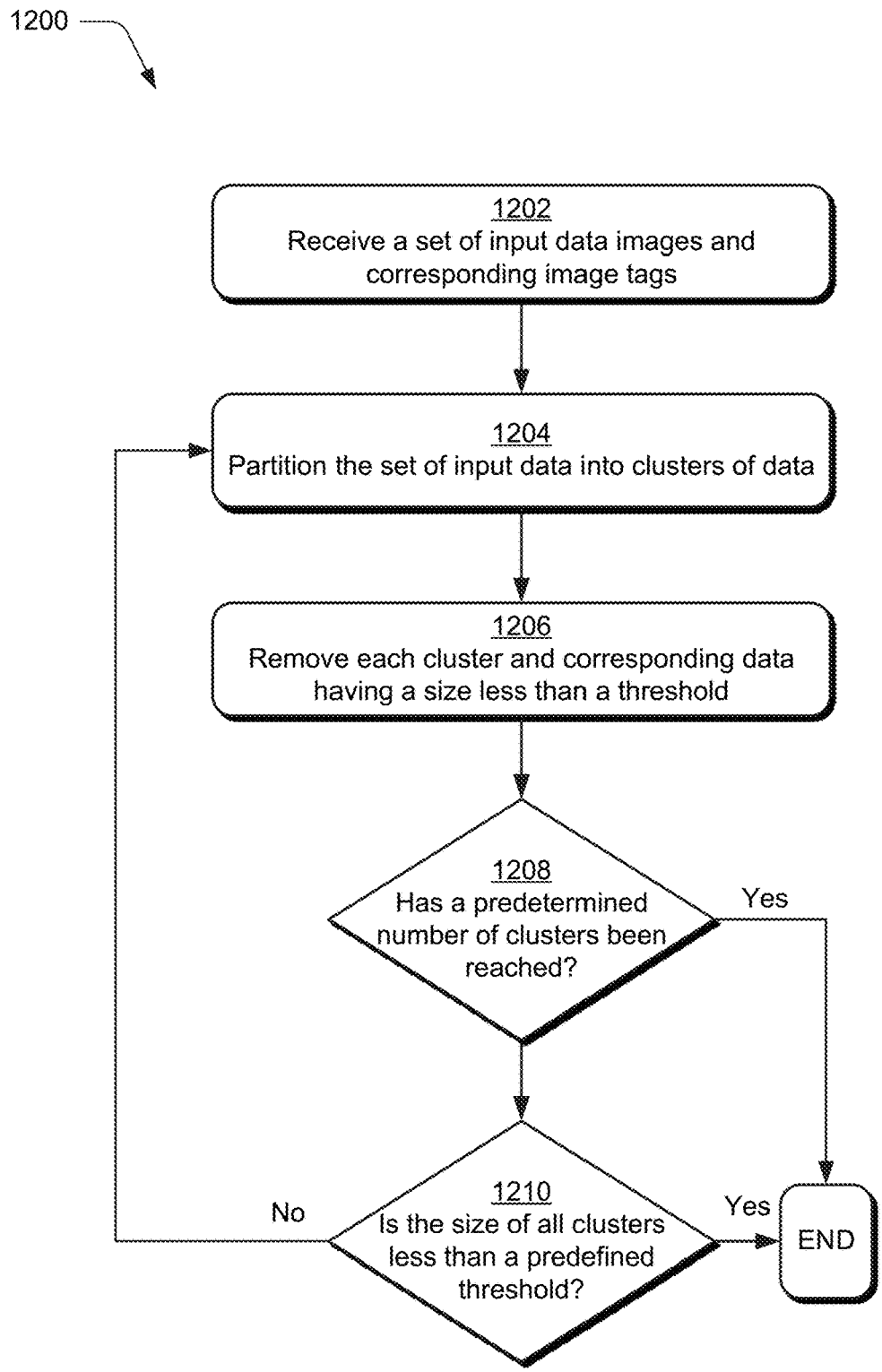
FIGS. 12-14 is a flow diagram depicting a procedure in an example implementations of machine learning training for image tagging of digital images using machine learning by a computing device.

Turning now to FIG. 12, a flow diagram is provided that illustrates a procedure 1400 for addressing cluster imbalance in accordance with an embodiment of the present invention. To begin, a set of input data including images and corresponding image tags is initially received (block 1202). The input data may be stored in and received from an image database. The input data is utilized to train a classifier (e.g., CNN) so that an image feature may be extracted from the CNN for a given image and a relevance score of a tag can be predicted. However, as noted above, in a typical KMeans clustering algorithm, a small number of dominant clusters receive the majority of data points (resulting in imbalanced clusters).

To overcome cluster imbalance, data from the set of input data is partitioned into clusters (block 1204) utilizing the modified R-KMeans technique. To do so, a maximum cluster size and/or a number of desired clusters may be defined by a user. During the R-KMeans process, KMeans is utilized to divide the input data into a number of clusters. Each cluster that is less than the predefined size is removed (block 1206). It is then determined (block 1208), whether the predetermined number of clusters has been reached. If it has, the input data has been clustered without cluster imbalance and the process ends. It is also determined (block 1210) whether the size of all clusters in the number of clusters is less than a predefined threshold. If it is, the input data has been clustered without cluster imbalance and the process ends.

If neither end condition is met, the process repeats with the remaining data that is not in a cluster that has been removed. As described above, this process repeats until a maximum number of clusters have been added to the cluster set or the size of each of the clusters resulting from an R-KMeans iteration is below a predefined threshold. These clusters are then used to train respective models as part of machine learning for use in generating image tags as described in relation to FIG. 2.

Figure 13:
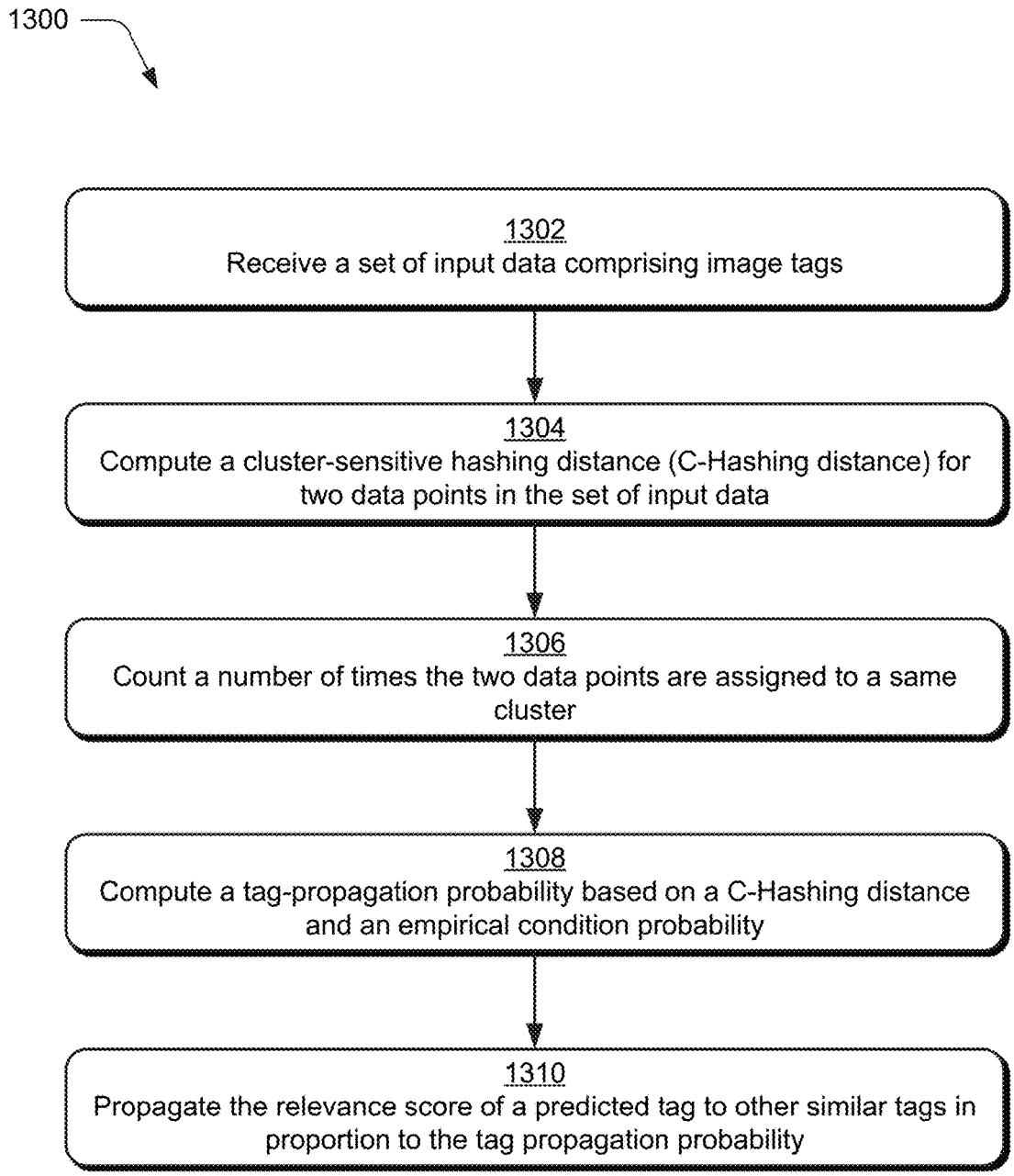

In some implementations, the R-KMeans technique is utilized to compute a cluster-sensitive hashing distance (C-Hashing distance) for two data points in the set of input data. Referring now to FIG. 13, a procedure 1300 is illustrated for improving tag prediction performance for rare tags. For instance, the procedure 1300 may be employed utilizing the image tagging module 118 of FIG. 1. As shown, a set of input data comprising image tags is received (block 1302).

A C-Hashing distance is computed (block 1304) for two data points in the set of input data. To do so, the number of times the two data points are assigned to a same cluster is counted (block 1306). The C-Hashing distance is calculated as (the number of iterations of R-KMeans minus the number of times the two data points are assigned to the same cluster) divided by the number of iterations of R-KMeans.

In some implementations, the C-Hashing distance is computed where each tag is represented as a feature vector based on a context-window co-occurrence matrix. Each row of the matrix corresponds to a tag and each entry represents the number of times that a second tag occurs in the context window of a first tag. To generate the feature vector for the C-Hashing distance, a row normalization of the matrix is performed so that each row sums up to 1. The square root of each entry of the row-normalized matrix is performed followed by a PCA dimension reduction to reduce the feature dimension. Each row of the resultant matrix represents the feature vector of the corresponding tag which can be used to compute the C-Hashing distance.

A tag propagation probability can be computed (block 1308), based on the C-Hashing distance and an empirical condition probability. The empirical condition probability is defined as (the number of times a first tag co-occurs with a second tag in an image's tag set) divided by the total occurrences of the second tag. To determine the tag propagation probability from the second tag to the first tag, the C-Hashing distance is multiplied by the empirical condition probability. Although the C-Hashing distance is a symmetric distance measure, the empirical condition probability is not, which helps to hinder the relevance propagation from more general words to more specific words. In this way, a relevance score for a predicted tag can be propagated (block 1310) to other similar tags in proportion to the tag propagation probability. This can improve the tag prediction performance for rare tags.

Figure 14:
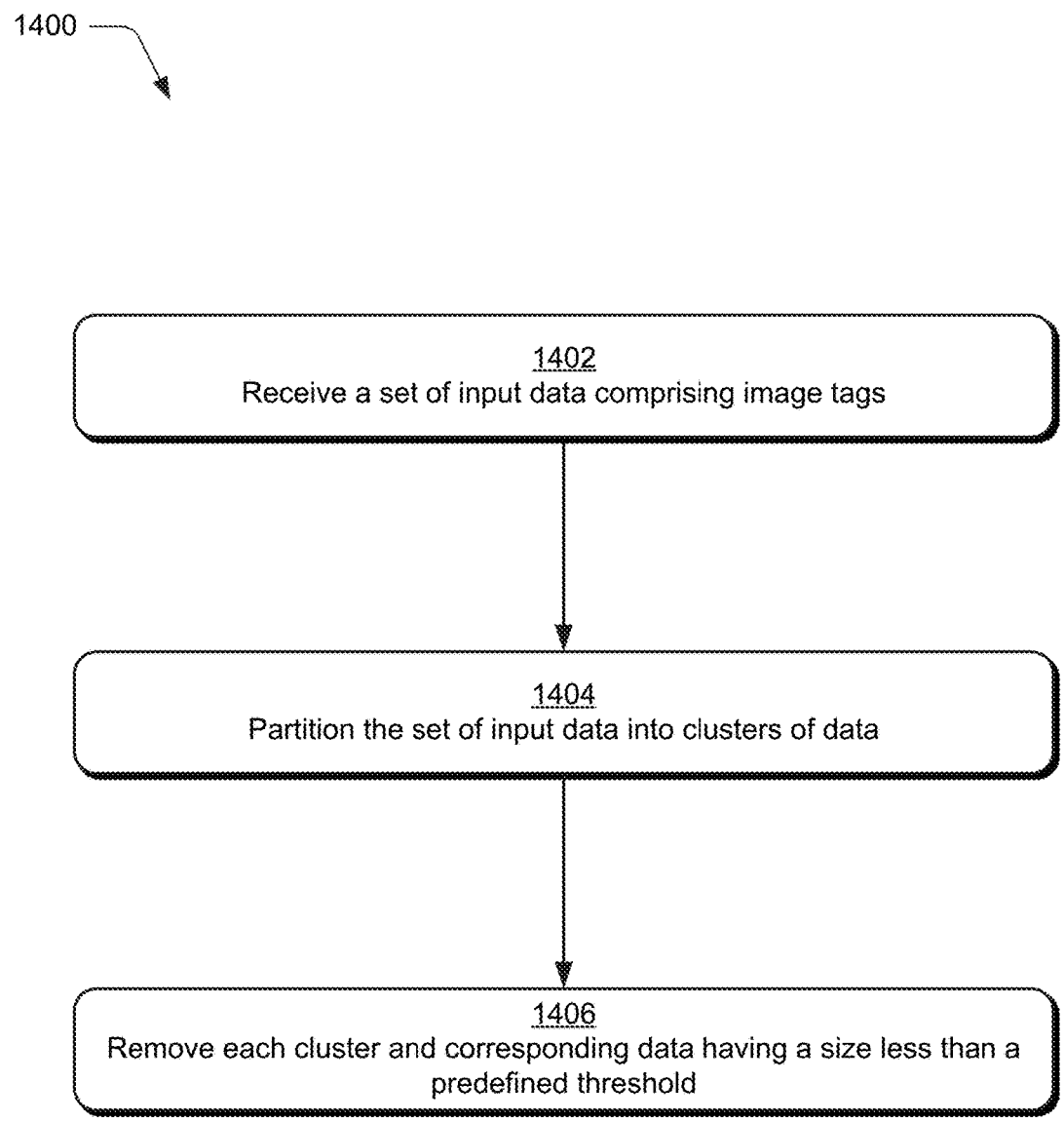

Referring now to FIG. 14, a procedure 1400 is depicted for addressing user tagging biases, utilizing a Div-KNN Framework. For instance, the procedure 1400 may be employed utilizing the image tagging module 118 of FIG. 1. Initially a CNN may be utilized to extract features from an input image. The features may be utilized to select an image database. A set of input data comprising images and associated image tags is received (block 1402). The set of input data is received from the selected database based on the extracted features of the input image.

It is determined how similar image tag providers are for a pair of images (block 1404). To do so, an effective number of votes for a particular tag is determined, which considers how similar tag sequences are for a pair of images in an image set received from the image database (block 1406). In this way, the Div-KNN Framework can determine the degree of similarity of the image tag providers for the pair of images and eliminate or reduce tagging biases.

The effective number can be formulated as $$\frac{1}{1-Q},$$

where $$Q = \frac{1}{N^2} \sum_{i=1}^{N} \sum_{j=1}^{N} d_{i,j},$$

where $0 \leq d_{i,j} \leq 1$. In this formulation, N represents the number of votes for a particular tag for each of the nearest neighbors of the input image, di, j represents the pair-wise distance function which returns the distance for all pairs of instances in the image set, and may be further defined by: $d_{i,j}=\alpha f_{tag}(i, j)+(1-\alpha)f_{usr}(i, j)$, where $f_{tag}(i, j)$ measures how similar the tag sequences of instances i and j are and $f_{usr}(i, j)$ is a distance function reflecting how close the users (image tag providers) of i and j are. In practice, a user identification associated with the image and other metadata may be utilized to measure the user distance.

In some implementations, a C-Hashing distance is computed for two data points in the set of input data. A tag propagation probability based on the C-Hashing distance and an empirical condition probability can then be computed, as described above. The relevance score of a predicted tag can be propagated to other similar tags in proportion to the tag propagation probability.

In some implementations, a keyword that is likely to be part of a bigram is down-weighted based on a predicted tag set. This decreases the tags that may come from a bigram. The keyword can be down-weighted by applying $$\acute{S}_i = S_i - \gamma \max_{j \in B_i} \min\{S_j, S_i\},$$

where $B_i \triangleq \{x_j \in T: x_i \text{ and } x_j \text{ compose a bigram in } T\}$ and $T=\{T_i\}_{i=1}^n$ denotes a dictionary of tags, and $\{S_i\}_{i=1}^n$ denotes predicted relevance scores for a given image.

In some implementations, Partial Linear Squares (PLS) are utilized for each tag to learn a low dimensional linear projection. This enables a high dimension image feature to be projected to a low dimension space. A support vector machine (SVM) classifier can then be trained for a dictionary of tags in the low dimensional space using k nearest neighbors as training samples. Confidence scores (i.e., the output classification scores from SVM classification) can then be computed for each tag for a query image.

Example System and Device

Figure 15:
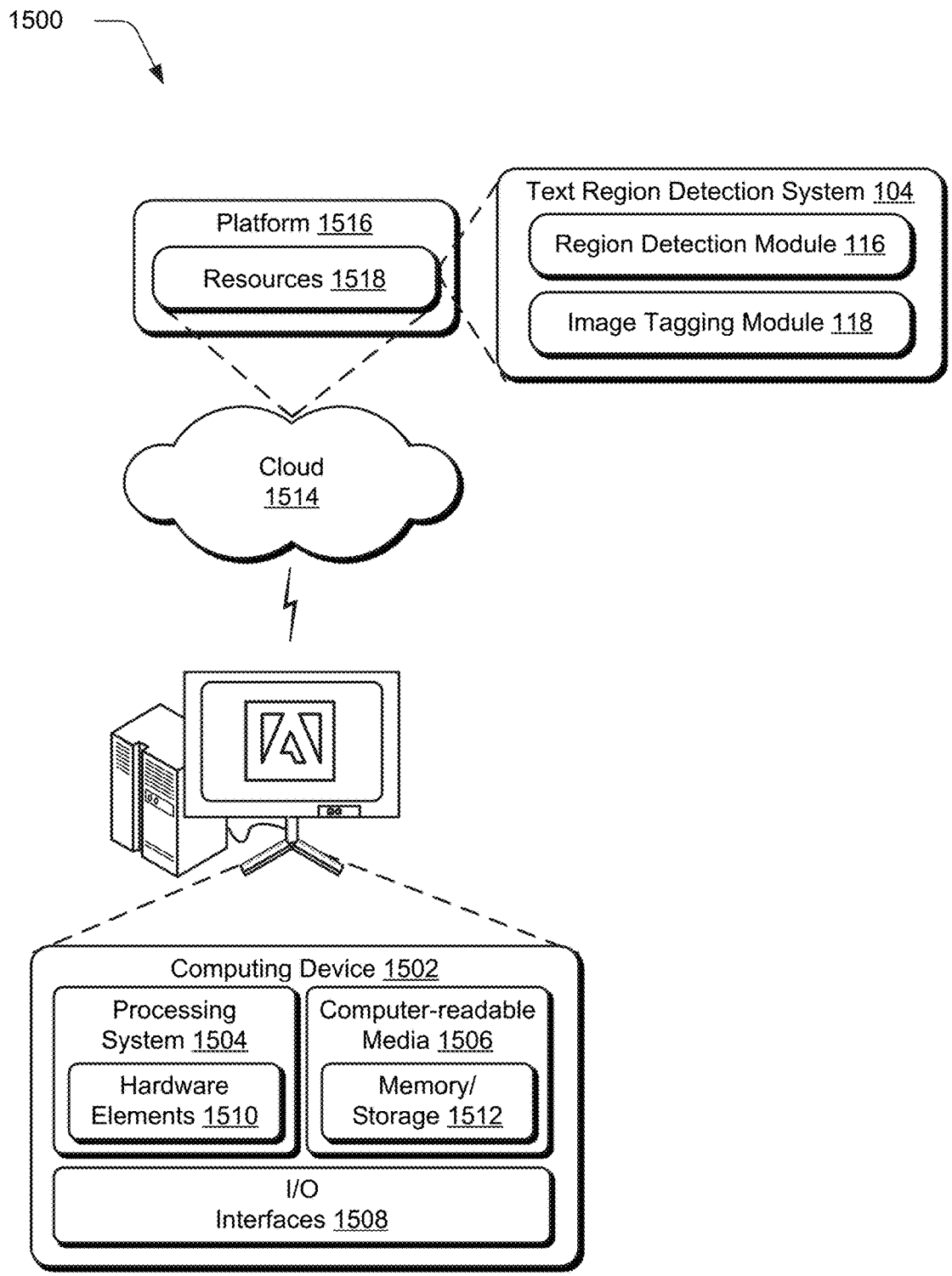
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the text region detection system 104, region detection module 116, and image tagging module 118. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An automated text region detection method implemented by at least one computing device, the method comprising:
    locating, by the at least one computing device, a text region candidate in a digital image;
    generating, by the at least one computing device, a plurality of image tags for the text region candidate using a plurality of classifiers trained as part of machine learning, the plurality of classifiers including:
        a classifier having a model configured to generate an image tag indicative of text; and
        a classifier having a model configured to generate an image tag not indicative of text;
    determining, by the at least one computing device, whether the text region candidate includes text based on inclusion of the image tag indicative of text and the image tag not indicative of text in the plurality of image tags generated for the text region candidate; and
    outputting, by the at least one computing device, an indication of a text region corresponding to the text region candidate in the digital image responsive to the determining the text region candidate includes text.

2. The method as described in claim 1, wherein the image tag not indicative of text specifies a confidence level that the text region candidate is part of a natural image scene.

3. The method as described in claim 1, wherein the image tag indicative of text specifies a confidence level of the text region candidate as including a letter, text, alphabet, number, character, font, or word.

4. The method as described in claim 1, wherein the plurality of classifiers are support vector machine (SVM) classifiers.

5. The method as described in claim 1, further comprising:
locating, by the at least one computing device, another text region candidate in the digital image;
generating, by the at least one computing device, another plurality of image tags using the plurality of classifiers based on the other text region candidate;
determining, by the at least one computing device, whether the other text region candidate includes text based on inclusion of the image tag indicative of text and the image tag not indicative of text in the other plurality of image tags generated for the text region candidate; and
removing, by the at least one computing device, the other text region candidate from consideration as the text region responsive to the determining the other text region candidate does not include text.

6. The method as described in claim 1, wherein the digital image is of a natural image scene.

7. The method as described in claim 1, further comprising:
detecting, by the at least one computing device, text in the text region candidate using optical character recognition; and
outputting, by the at least one computing device, the detected text.

8. The method as described in claim 7, further comprising translating the text or using the text as part of a search.

9. The method as described in claim 1, wherein the locating includes:
detecting, by the at least one computing device, a plurality of regions based on the digital image, each region of the plurality of regions including a different respective portion of the digital image as likely including text;
generating, by the at least one computing device, lines between pairs of the plurality of regions;
matching, by the at least one computing device, a first line of the lines with a set of the regions based on respective features; and
generating, by the at least one computing device, the text region candidate as a bounding box based at least in part on the matching.

10. The method as described in claim 9, wherein the generating of the lines includes:
selecting a first region of the plurality of regions;
identifying a second region of the plurality of regions based on a distance to the first region;
comparing features of the first region and features of the second region; and
generating at least one said line between the first region and the second region based on the comparing.

11. The method as described in claim 9, wherein the generating of the lines includes identifying a pair of regions based on color properties, geometric properties, or stroke width of text components in the pair.

12. An automated text region detection system comprising:
a processing system; and
a computer-readable storage medium having instructions stored thereon that, responsive to execution by the processing system, causes the processing system to perform operations comprising:
locating a plurality of text region candidates in a digital image;
generating a plurality of image tags for respective ones of the plurality of text region candidates, the generation of the plurality of image tags based on a plurality of classifiers trained as part of machine learning, the plurality of classifiers including:
a classifier having a model configured to generate an image tag indicative of text; and
a classifier having a model configured to generate an image tag that is not indicative of text; and
determining whether respective ones of the plurality of text region candidates include text based on inclusion of the image tag indicative of text and the image tag not indicative of text in the plurality of image tags generated for the respective ones of the plurality of text region candidates;
filtering the plurality of text region candidates based on whether the respective one of plurality of text region candidates include or do not include text; and
output a result of the filtering in a user interface.

13. The system as described in claim 12, wherein the locating includes:
detecting a plurality of regions based on the digital image, each of the plurality of regions including a different respective portion of the digital image as likely including text;
generating lines between pairs of the plurality of regions;
matching a first line of the lines with a set of the regions based on features of the regions of the set; and
generating a respective said region as a bounding box based at least in part on the matching.

14. The system as described in claim 12, wherein the image tag not indicative of text is included in a list of image tags that are identified as not likely indicative of text.

15. The system as described in claim 12, wherein the image tag indicative of text indicates a letter, text, alphabet, number, character, font, or word.

16. The system as described in claim 12, wherein the plurality of classifiers are support vector machine (SVM) classifiers.

17. The system as described in claim 12, wherein the operations further comprise detecting text in the result using optical character recognition.

18. An automated text region detection system comprising:
means for locating a plurality of text region candidates in a digital image;
means for generating a plurality of image tags for respective ones of the plurality of text region candidates, the generating means including a plurality of classifiers trained as part of machine learning, the plurality of classifiers including:
a classifier having a model configured to generate an image tag indicative of text; and
a classifier having a model configured to generate an image tag that is not indicative of text; and
means for filtering the plurality of text region candidates as part of text region detection based on inclusion of the image tag indicative of text and the image tag not indicative of text in the plurality of image tags for respective ones of the plurality of text region candidates.

19. The system as described in claim 18, wherein the plurality of classifiers are support vector machine (SVM) classifiers.

20. The system as described in claim 18, further comprising means for detecting text in a result of filtering the plurality of text region candidates, the detecting means using optical character recognition.

* * * * *